United States Patent
Xie et al.

(10) Patent No.: US 12,516,113 B2
(45) Date of Patent: Jan. 6, 2026

(54) HUMANIZED ANTI-IL17A ANTIBODY AND APPLICATION THEREOF

(71) Applicant: SinoCellTech Ltd., Beijing (CN)

(72) Inventors: Liangzhi Xie, Beijing (CN); Chunyun Sun, Beijing (CN); Tianjiao Liu, Beijing (CN); Jing Li, Beijing (CN)

(73) Assignee: SinoCellTech Ltd., Beijing (CN)

( * ) Notice: Subject to any disclaimer, the term of this patent is extended or adjusted under 35 U.S.C. 154(b) by 1018 days.

(21) Appl. No.: 17/584,766

(22) Filed: Jan. 26, 2022

(65) Prior Publication Data

US 2022/0144936 A1    May 12, 2022

Related U.S. Application Data

(63) Continuation of application No. PCT/CN2020/104448, filed on Jul. 24, 2020.

(30) Foreign Application Priority Data

Jul. 26, 2019    (CN) .......................... 201910682988.7

(51) Int. Cl.
     *C07K 16/24*      (2006.01)
     *A61K 39/00*      (2006.01)
     *A61K 47/68*      (2017.01)

(52) U.S. Cl.
     CPC ........ *C07K 16/244* (2013.01); *A61K 47/6845* (2017.08); *A61K 2039/505* (2013.01);
     (Continued)

(58) Field of Classification Search
     CPC .............. C07K 16/244; C07K 2317/24; C07K 2317/76; C07K 2317/92; A61K 47/6845; A61K 2039/505
See application file for complete search history.

(56) References Cited

U.S. PATENT DOCUMENTS

2017/0355756 A1*   12/2017   Julien .................... C07K 16/18

FOREIGN PATENT DOCUMENTS

CN    109679920 A    4/2019
CN    110003337 A    7/2019
(Continued)

OTHER PUBLICATIONS

Chen et al., Enhancement and destruction of antibody function by somatic mutation: unequal occurrence is controlled by V gene combinatorial associations. EMBO J. Jun. 15, 1995;14(12):2784-94. (Year: 1995).*

(Continued)

*Primary Examiner* — Aurora M Fontainhas
*Assistant Examiner* — Selam Berhane
(74) *Attorney, Agent, or Firm* — Smart & Biggar LP

(57) ABSTRACT

The present invention belongs to the field of immunotherapy of autoimmune diseases and relates to a humanized monoclonal antibody that binds IL17A. The present invention discloses a nucleic acid sequence encoding said antibody, a vector containing said nucleic acid sequences, a pharmaceutical composition and a kit. Said monoclonal antibody is capable of specifically binding IL17A protein with high affinity, has a strong ability to block the binding of IL17A, IL17A/F with receptor IL17RA. The humanized monoclonal antibody of the present invention can be used for the treatment of psoriasis, etc.

13 Claims, 9 Drawing Sheets
Specification includes a Sequence Listing.

(52) U.S. Cl.
    CPC ...... *C07K 2317/24* (2013.01); *C07K 2317/76* (2013.01); *C07K 2317/92* (2013.01)

(56) References Cited

FOREIGN PATENT DOCUMENTS

| WO | WO-2008068048 A2 | * | 6/2008 | .............. A61P 31/10 |
|---|---|---|---|---|
| WO | 2009147362 A1 | | 12/2009 | |
| WO | 2014161570 A1 | | 10/2014 | |
| WO | WO2015/022656 A1 | | 2/2015 | |
| WO | 2018236728 A1 | | 12/2018 | |
| WO | 2019040230 A1 | | 2/2019 | |
| WO | 2019097493 A1 | | 5/2019 | |

OTHER PUBLICATIONS

Edwards et al., The remarkable flexibility of the human antibody repertoire; isolation of over one thousand different antibodies to a single protein, BLyS. J Mol Biol. Nov. 14, 2003;334(1):103-18. (Year: 2003).*

Koenig et al., Mutational landscape of antibody variable domains reveals a switch modulating the interdomain conformational dynamics and antigen binding. PNAS Jan. 24, 2017 114 (4) E486-E495; first published Jan. 5, 2017; (Year: 2017).*

Kussie, Paul H., "A Single Engineered Amino Acid Substitution Changes Antibody Fine Specificity", 1994, Journal of Immunology 152(1): pp. 146-152. (Year: 1994).*

Office Action issued in corresponding Indonesian Patent Application No. P00202201602 dated Mar. 27, 2025, with English machine translation.

Russian First Examiner's Report, Application No. RU2022103525, Sep. 30, 2022, 3 pages, Federal Service for Intellectual Property (Rospatent), Moscow, Russia.

Hua, Cassie, Australia Office Action, Application No. 2020322569, Feb. 15, 2024, 2 pages, IP Australia, Adelaide SA, Australia.

Yurack, Mimi, Canadian Office Action, Application No. 3,148,491, Dec. 2, 2022, 3 pages, Canadian Intellectual Property Office, Gatineau, Quebec.

Yurack, Mimi, Canadian Office Action, Application No. 3,148,491, Apr. 20, 2022, 3 pages, Canadian Intellectual Property Office, Gatineau, Quebec.

Turri, Matteo, European Search Report, Application No. EP 30 95 6348, 6 pages, European Patent Office, Munich, Germany.

Fala, Loretta et al., Cosentyx (Secukinumab): First IL-17A Antagonist REceives FDA Approval for Moderate-to-Severe Plaque Psoriasis, 4 pages, America Health & Drug Benefits, vol. 9, Mar. 2016.

Liu, Ling et al., Generation and characterization of ixekizumab, a humanized monoclonal antibody that neutralizes interleukin-17A, 12 pages, Journal of Inflammation Research, 2016:9 39-50.

International Search Report and Written Opinion dated Sep. 11, 2020 in connection with International Application No. PCT/CN2020/104448, 9 pages.

Office Action issued in corresponding Korean Patent Application No. 10-2022-7005577 dated Sep. 23, 2024.

Office Action issued in corresponding Malaysian Patent Application No. PI2022000335 dated Sep. 25, 2024.

* cited by examiner

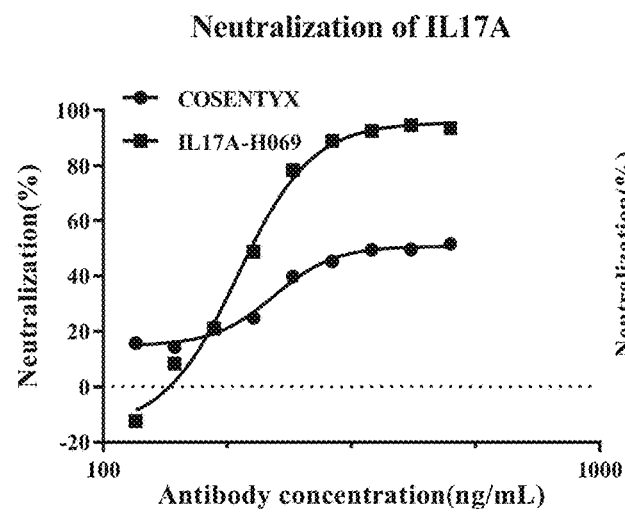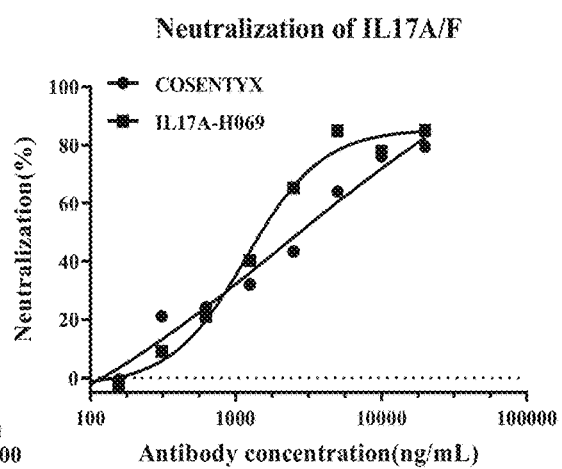
FIG. 7A  FIG. 7B
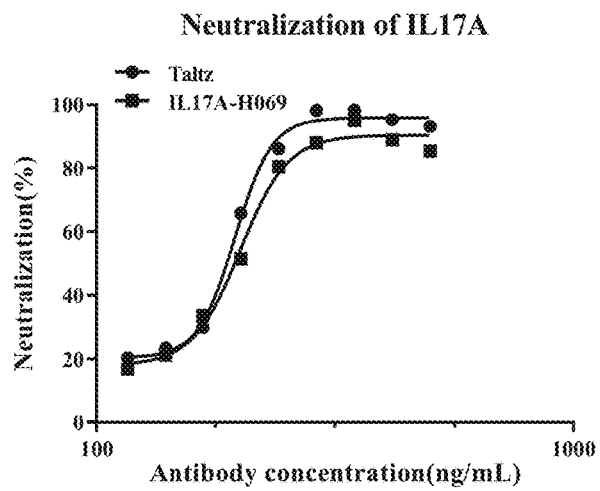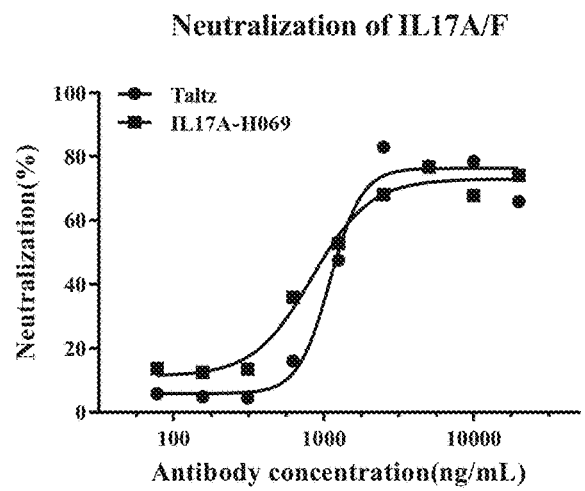
FIG. 7C  FIG. 7D

HUMANIZED ANTI-IL17A ANTIBODY AND APPLICATION THEREOF

CROSS-REFERENCE SECTION

This application is a continuation of and claims priority to PCT Application No. PCT/CN2020/104448, filed Jul. 24, 2020, which itself claims priority to Chinese Patent Application No. CN201910682988.7, filed on Jul. 26, 2019, the content of which is hereby incorporated by reference in its entirety.

TECHNICAL FIELD

The present invention relates to the field of tumor immunotherapy, and relates to a humanized anti-IL17A monoclonal antibody drug and application thereof.

BACKGROUND

IL17A, also commonly referred to as IL-17, is an inflammatory cytokine consisting of 155 amino acids with a molecular weight of 35 kD. It is mainly secreted by helper T cells17, in addition to T cells17, CD4+, CD8+T, and γδ-T cells could also secrete IL-17. The IL-17 family contains six members, IL17A, IL-17B, IL-17C, IL-17D (IL-27), IL-17E (IL-25), and IL-17F (Gu, Wu et al. 2013), among which IL17A and IL-17F are the most important members. Being of 55% amino acid homology, IL17A and IL-17F can form homodimers or heterodimers connected by disulfide bonds (Dubin and Kolls 2009). Upon binding to a variety of IL-17RA-expressing cells in the IL-17 receptor family such as: macrophages, dendritic cells, hematopoietic cells, osteoblasts, fibroblasts, etc., IL17A/A or IL-17A/F dimer can activate NFκB, C/EBPs, MAPK and other signal pathways in the receptor cells, inducing these cells to secrete inflammatory factors and chemokines (IL-6, IL-8, CXCL1, etc.), recruit neutrophils, and mediate the development of inflammatory responses (Mitra, Raychaudhuri et al. 2014). The occurrence and development of many inflammation-related autoimmune diseases such as psoriasis, psoriatic arthritis, rheumatoid arthritis, and ankylosing spondylitis are closely associated with the IL-17 pathway (Wang, Suzuki et al. 2017), with significant up-regulation of IL-17 expression levels in the serum of patients (Marinoni, Ceribelli et al. 2014), leading to a persistent inflammatory response. In addition, IL-17 can also directly act on endothelial cells, epithelial cells, fibroblasts and keratinocytes in the skin, increasing the release of multiple inflammatory factors and creating pathological skin (Mitra, Raychaudhuri et al. 2014, Brembilla, Senra et al. 2018). Therefore, blockage of the IL-17 pathway provides feasibility to inhibit autoimmune diseases process.

Currently marketed antibody drugs targeting IL-17 are COSENTYX®/Secukinumab (U.S. Pat. No. 7,807,155B2) from Novartis and Taltz®/Ixekizumab (U.S. Pat. No. 7,838,638B2/CN101326195B) from Eli Lilly, the main mechanism is: through its binding to IL17A and IL17A/F, the binding of IL17A to the receptor (IL-17RA/C) is inhibited, sequentially the release of inflammatory factors and chemokines is blocked, thus autoimmune diseases (Fala 2016, Liu, Lu et al. 2016) is effectively alleviated. Secukinumab is approved for the treatment of plaque psoriasis, psoriatic arthritis, and ankylosing spondylitis. Ixekizumab is approved for the treatment of plaque psoriasis and psoriatic arthritis. The humanized monoclonal IL17A antibody in the present invention is able to specifically bind IL17A protein with high affinity, has a strong ability to block the binding of IL17A, IL17A/F to the receptor IL17RA, and has a superior or equivalent ability to block IL17A, IL17A/F from inducing the inflammatory cytokine secretion of human epidermal fibroblasts HFF compared with comparable drugs; in the mouse psoriasis model, said antibody also shows significantly better in vivo pharmacodynamic activity than comparable drugs, with significantly lower PASI scores after dosing; said humanized antibody demonstrates favorable pharmacokinetic profiles in the cynomolgus monkeys, including rapid absorption after subcutaneous injection, long half-life, and better drug exposure, laying the foundation for longer dosing cycles. The antibody of the present invention are planned to be used for, including but not limited to, the treatment of psoriasis.

SUMMARY

The present invention meets the above need by developing an IL17A binding antibody with a novel structure. The present invention discloses a humanized monoclonal antibody that binds IL17A specifically with high affinity and has a strong ability to block the binding of IL17A, IL17A/F to the receptor IL17RA. Compared with other comparable drugs, the antibody provided herein has superior or equivalent capability of blocking IL17A and IL17A/F to induce the inflammatory cytokine secretion of human epidermal fibroblasts HFF; in a mouse psoriasis model, said antibody also showed a significant advantage of in vivo pharmacological activity than comparable drugs, and significantly reduced PASI scores after dosing; in the pharmacokinetic study in cynomolgus monkeys, said humanized antibody demonstrated superior pharmacokinetic characteristics, including rapid absorption after subcutaneous injection, long half-life, better drug exposure, etc., laying the foundation for longer dosing cycles. The humanized monoclonal antibody of the present invention can be used for the treatment of psoriasis.

In one aspect, the present invention provides an isolated anti-IL17A antibody or antigen-binding fragment thereof, comprising a heavy chain variable region having a heavy chain CDR1 region having the amino acid sequence as set forth in SEQ ID NO: 13 and a heavy chain CDR2 region having the amino acid sequence as set forth in SEQ ID NO: 14 and a heavy chain CDR3 region having the amino acid sequence as set forth in SEQ ID NO: 15; and a light chain variable region having a light chain CDR1 region having the amino acid sequence as set forth in SEQ ID NO: 10, a light chain CDR2 region having the amino acid sequence as set forth in SEQ ID NO: 11, and a light chain CDR3 region having the amino acid sequence as set forth in SEQ ID NO: 12. (The 6 CDRs shared by murine antibody M069 and humanized antibody H069 are identical in mouse and human)

In one embodiment, said anti-IL17A antibody or antigen-binding fragment thereof has a heavy chain variable region having the amino acid sequence as set forth in SEQ ID NO: 22, or the amino acid sequences having at least 90%, 92%, 95%, 98% or 99% sequence identity to SEQ ID NO: 22; and a light chain variable region having the amino acid sequence as set forth in SEQ ID NO: 23, or the amino acid sequences having at least 90%, 92%, 95%, 98% or 99% sequence identity to SEQ ID NO: 23. (Amino acid sequences of the heavy chain and light chain variable regions of the humanized antibody H069)

In one embodiment, said anti-IL17A antibody or antigen-binding fragment thereof is a humanized antibody or a chimeric antibody.

In one embodiment, said anti-IL17A antibody further comprises a heavy chain constant region and a light chain constant region, preferably said heavy chain constant region is the IgG1 heavy chain constant region having the amino acid sequence as set forth in SEQ ID NO: 24, or the amino acid sequences having at least 90%, 92%, 95%, 98%, or 99% sequence identity to SEQ ID NO: 24; and/or said light chain constant region is the human kappa light chain constant region having the amino acid sequence as set forth in SEQ ID NO: 25, or the amino acid sequences having at least 90%, 92%, 95%, 98%, or 99% sequence identity to SEQ ID NO: 25. (Amino acid sequences of the heavy chain and light chain constant regions of the humanized antibody H069)

In one embodiment, said anti-IL17A antibody further comprises a signal peptide linked to the heavy chain variable region and/or a signal peptide linked to the light chain variable region, preferably said signal peptide linked to the heavy chain variable region is an amino acid sequence as set forth in SEQ ID NO: 20 or amino acid sequences having at least 90%, 92%, 95%, 98% or 99% sequence identity to SEQ ID NO: 20; and/or said signal peptide linked to the light chain variable region is an amino acid sequence as set forth in SEQ ID NO: 21 or amino acid sequences having at least 90%, 92%, 95%, 98% or 99% sequence identity to SEQ ID NO: 21. (Amino acid sequences of the heavy chain and light chain signal peptides of the humanized antibody H069)

In one embodiment, said anti-IL17A antibody or antigen-binding fragment thereof is an IgG antibody, preferably an IgG1 antibody.

In one embodiment, said anti-IL17A antibody or antigen-binding fragment thereof is a monoclonal antibody.

In one embodiment, the binding affinity KD of said anti-IL17A antibody or antigen-binding fragment thereof to the recombinant human IL17A protein is 0.1-10E-11M, preferably 0.5-5E-11M, and more preferably 2.88E-11M.

In one embodiment, the binding affinity KD of said anti-IL17A antibody or antigen-binding fragment thereof to the recombinant human IL17A/F protein is 0.1-10E-10M, preferably 0.5-5E-10M, and more preferably 5.37E-10M.

In one embodiment, said antigen-binding fragment is Fv, Fab, Fab', Fab'-SH, F(ab') 2, Fd fragment, Fd' fragment, single chain antibody molecule or single domain antibody; wherein the single chain antibody molecule is preferably scFv, di-scFv, tri-scFv, diabody or scFab.

In another aspect, the present invention provides an antibody-drug conjugate, comprising the anti-IL17A antibody or antigen-binding fragment thereof as described herein and an additional therapeutic agent, preferably said anti-IL17A antibody or antigen-binding fragment thereof is connected with the additional therapeutic agent via a linker.

In yet another aspect, the present invention provides a nucleic acid encoding the anti-IL17A antibody or antigen-binding fragment thereof as described herein.

In one embodiment, said nucleic acid comprises a nucleotide sequence as set forth in SEQ ID NO: 30 encoding heavy chain variable region and/or a nucleotide sequence as set forth in SEQ ID NO: 31 encoding light chain variable region.

In yet another aspect, the present invention provides an expression vector comprising the nucleic acid as described herein.

In yet another aspect, the present invention provides a host cell comprising the nucleic acid as described herein or the expression vector as described herein.

In yet another aspect, the present invention provides a method for producing the anti-IL17A antibody or antigen-binding fragment thereof as described herein, comprising culturing the host cell as described herein under conditions suitable for antibody expression, and recovering the expressed antibody from the culture medium.

In yet another aspect, the present invention provides a pharmaceutical composition comprising the anti-IL17A antibody or antigen-binding fragment thereof as described herein, or the antibody-drug conjugate as described herein, or the nucleic acid as described herein, or the expression vector as described herein, and a pharmaceutically acceptable carrier.

In yet another aspect, the present invention provides anti-IL17A antibodies or antigen-binding fragments thereof as described herein, or antibody-drug conjugates as described herein, or pharmaceutical compositions as described herein, for the treatment of psoriasis.

In yet another aspect, the present invention provides a method for treating psoriasis, comprising administering to a subject in need a therapeutically effective amount of the anti-IL17A antibody or antigen-binding fragment thereof as described herein, or the antibody-drug conjugate as described herein, or the pharmaceutical composition as described herein, thereby treating psoriasis.

In yet another aspect, the present invention provides the use of the anti-IL17A antibody or antigen-binding fragment thereof as described herein, or the antibody-drug conjugate as described herein or the pharmaceutical composition as described herein in the preparation of a medicament for the treatment of psoriasis.

In yet another aspect, the present invention provides a pharmaceutical composition comprising the anti-IL17A antibody or antigen-binding fragment thereof as described herein, or the antibody-drug conjugate as described herein, or the pharmaceutical composition as described herein, and one or more additional therapeutic agents.

In yet another aspect, the present invention provides a kit comprising the anti-IL17A antibody or antigen-binding fragment thereof as described herein, or the antibody-drug conjugate as described herein, or the pharmaceutical composition as described herein, and preferably further comprising a device for administration.

BRIEF DESCRIPTION OF THE DRAWINGS

FIG. 7A shows that IL17A-H069 blocks IL17A-mediated IL-6 secretion of HFF cells and includes a positive control COSENTYX at an antibody concentration ranging from 100 ng/ml to 1,000 ng/mL.

FIG. 7B shows that IL17A-H069 blocks IL17A-mediated IL-6 secretion of HFF cells and includes a positive control COSENTYX at an antibody concentration ranging from 100 ng/ml to 100,000 ng/mL.

FIG. 7C shows that IL17A-H069 blocks IL17A-mediated IL-6 secretion of HFF cells and includes a positive control Taltz at an antibody concentration ranging from 100 ng/ml to 1,000 ng/mL.

FIG. 7D shows that IL17A-H069 blocks IL17A-mediated IL-6 secretion of HFF cells and includes a positive control Taltz at an antibody concentration ranging from 100 ng/ml to above 10,000 ng/mL.

DETAILED DESCRIPTION

Figure 1:
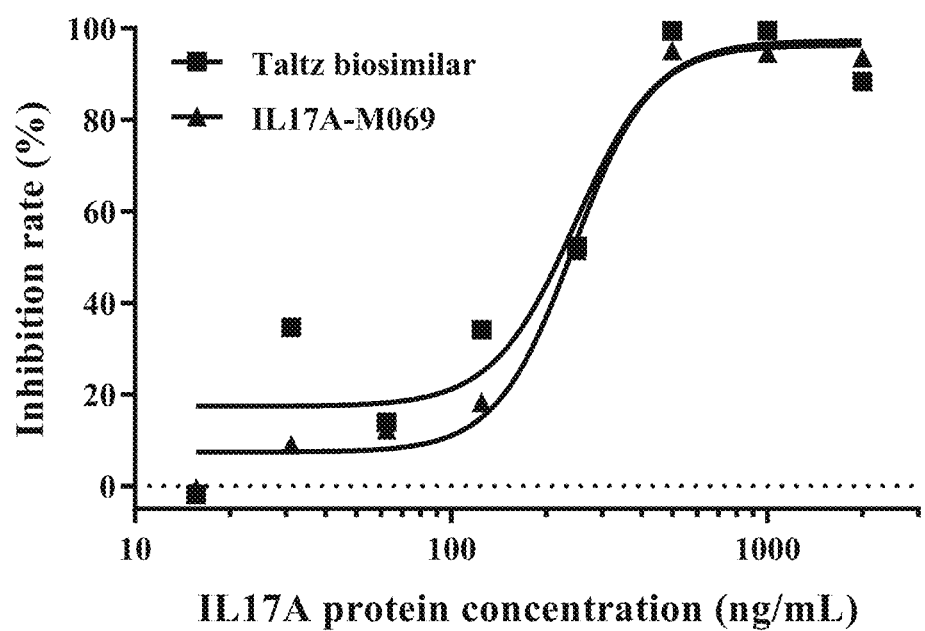
FIG. 1 shows that IL17A-M069 blocks IL17A-induced IL-6 secretion of HFF cells.

Various aspects of the present invention relate to an isolated anti-IL17A antibody or antigen-binding fragment thereof, an antibody-drug conjugate comprising said antibody or antigen-binding fragment thereof, a nucleic acid and an expression vector encoding said antibody or antigen-binding fragment thereof, and a host cell containing said nucleic acid or expression vector, a method for producing said anti-IL17A antibody or antigen-binding fragment thereof, a pharmaceutical composition comprising said anti-IL17A antibody or antigen-binding fragment thereof, and a method of using said anti-IL17A antibody or antigen-binding fragment thereof for treating psoriasis.

Definition

Unless otherwise stated, all technical and scientific terms used herein have the meaning normally understood by a person skilled in the art to which the present invention belongs. For the purposes of the present invention, the following terms are defined to be consistent with the meanings commonly understood in the art.

When used herein and in the appended claims, the singular forms "one", "a/an", "another" and "said" include the plural designation of the object unless the context clearly indicates otherwise.

The term "antibody" refers to an immunoglobulin molecule and refers to any form of antibody that exhibits the desired biological activity. These include, but are not limited to, monoclonal antibodies (including full-length monoclonal antibodies), polyclonal antibodies and multispecific antibodies (e.g. bispecific antibodies), and even antibody fragments. Typically, full-length antibody structures preferably comprise four polypeptide chains, two heavy (H) chains and two light (L) chains, typically interconnected by disulfide bonds. Each heavy chain contains a heavy chain variable region and a heavy chain constant region. Each light chain contains a light chain variable region and a light chain constant region. In addition to this typical full-length antibody structure, the structure also includes other derivative forms.

Said heavy chain variable region and light chain variable region can be further subdivided into more conservative regions (called framework regions (FR)) and hypervariable regions (called complementarity determining regions (CDR)) interspersed therewith.

The term "complementary determining region" (CDR, e.g. CDR1, CDR2 and CDR3) refers to such amino acid residues in the variable region of an antibody whose presence is necessary for antigen binding. Each variable region typically has three CDR regions identified as CDR1, CDR2 and CDR3. Each complementary determining region may contain amino acid residues from a "complementary determining region" as defined by Kabat (Kabat et al., Sequences of Proteins of Immunological Interest, 5th Ed. Public Health Service, National Institutes of Health, Bethesda, MD. 1991) and/or those residues from the "high-variable loop" (Chothia and Lesk; J MolBiol 196:901-917 (1987)).

The term "framework" or "FR" residues are those residues within the variable region other than CDR residues as defined herein.

Each heavy chain variable region and light chain variable region typically contains 3 CDRs and up to 4 FRs, said CDRs and FRs being arranged from the amino terminus to the carboxyl terminus in the following order, for example: FR1, CDR1, FR2, CDR2, FR3, CDR3, and FR4.

The complementary determining region (CDR) and the framework region (FR) of a given antibody can be identified using the Kabat system (Kabat et al: Sequences of Proteins of Immunological Interest, 5th edition, US Department of Health and Human Services, PHS, NIH, NIH Publication No. 91-3242, 1991).

The term "constant region" refers to such amino acid sequences in the light and heavy chains of an antibody that are not directly involved in the binding of the antibody to the antigen but exhibit a variety of effector functions such as antibody-dependent cytotoxicity.

According to the antigenic differences of the amino acid sequence of its constant region, the heavy chain of an antibody can be classified into five classes: α, δ, ε, γ, and μ. When it forms a complete antibody with the light chain, it can be classified into five classes: IgA, IgD, IgE, IgG and IgM, of which can be further classified into subclasses (isotypes), such as IgG1, IgG2, IgG3, IgG4, IgA and IgA2. Based on the amino acid sequence of its constant domain, the light chain of an antibody can be classified into κ and λ.

An "antigen-binding fragment of an antibody" comprises a portion of an intact antibody molecule that retains at least some of the binding specificity of the parent antibody and typically includes at least a portion of the antigen-binding region or variable region (e.g. one or more CDRs) of the parent antibody. Examples of antigen-binding fragments include, but are not limited to, Fv, Fab, Fab', Fab'-SH, F(ab')2, Fd fragment, Fd' fragment, single chain antibody molecules (e.g. scFv, di-scFv or tri-scFv, diabody or scFab), single domain antibodies.

The term "antibody fragment" refers to a non-intact antibody molecule that retains at least some of the biological properties of the parent antibody, including, but not limited to, an Fc fragment, in addition to those described above as "antigen-binding fragments".

The term "antibody-drug conjugate" or "ADC" refers to a binding protein, such as an antibody or antigen-binding fragment thereof, that chemically linked to one or more of chemical drugs (also referred to as agents herein), which may optionally be a therapeutic agent or a cytotoxic agent. In a preferred embodiment, an ADC includes an antibody, a cytotoxic or therapeutic drug, and a linker that enables the drug to be linked or conjugated to the antibody. ADCs usually have any value of 1 to 8 drugs conjugated to the antibody, including 2, 4, 6, or 8 drug-loading substances. Non-limiting examples of drugs that can be included in the ADCs are mitotic inhibitors, anti-tumor antibiotics, immunomodulators, vectors for gene therapy, alkylating agents, anti-IL17A agents, antimetabolites, boron-containing agents, chemotherapeutic protective agents, hormones, anti-hormonal agents, corticosteroids, photoactive therapeutic agents, oligonucleotides, radionuclide agents, topoisomerase inhibitors, tyrosine kinase inhibitors and radiosensitizers.

The term "chimeric antibody" refers to an antibody in which a part of the heavy chain and/or light chain is derived from a specific source or species, and the remaining part is derived from a different source or species. The "chimeric antibody" may also be a functional fragment as defined above. "Humanized antibodies" are a subset of "chimeric antibodies."

The term "humanized antibody" or "humanized antigen-binding fragment" is defined herein as an antibody or antibody fragment that is: (i) derived from a non-human source (e.g., a transgenic mouse carrying a heterologous immune system) and based on a human germline sequence; or (ii) a chimeric antibody where the variable region is of non-human origin and the constant region is of human origin; or (iii) a CDR transplant where the CDR of the variable region is of non-human origin and one or more frame work regions of the variable region are of human origin and the constant region, if any, is of human origin. The aim of "humanization" is to eliminate the immunogenicity of antibodies of non-human origin in the human body, while retaining the greatest possible affinity. It is advantageous to select the human framework sequence that is most similar to the framework sequence of the non-human source antibody as the template for humanization. In some cases, it may be necessary to replace one or more amino acids in the human framework sequence with corresponding residues in the non-human construct to avoid loss of affinity.

The term "monoclonal antibody" refers to an antibody derived from a substantially homogeneous population of antibodies, i.e. every single antibody comprised in the population is identical except for possible mutations (e.g. natural mutations) which may be present in very small quantities. The term "monoclonal" therefore indicates the nature of the antibody in question, i.e. not a mixture of unrelated antibodies. In contrast to polyclonal antibody preparations, which usually comprise different antibodies against different epitopes, each monoclonal antibody in a monoclonal antibody preparation is directed against a single epitope on the antigen. In addition to their specificity, monoclonal antibody preparations have the advantage that they are usually not contaminated by other antibodies. The term "monoclonal" should not be understood as requiring the production of said antibodies by any particular method.

The antibody "specifically binds" to a target antigen such as a tumor-associated peptide antigen target (in this case, PD-1), i.e. binds said antigen with sufficient affinity to enable said antibody to be used as a therapeutic agent, targeting a cell or tissue expressing said antigen, and does not significantly cross-react with other proteins, or does not significantly cross-react with proteins other than the homologues and variants of the target proteins mentioned above (e.g. mutant forms, splice variants, or protein hydrolysis truncated forms).

The term "binding affinity" refers to the strength of the sum of the non-covalent interactions between a molecule's individual binding sites and its binding partners. Unless otherwise stated, "binding affinity", when used herein, refers to the intrinsic binding affinity, which reflects a 1:1 interaction between members of a binding pair (e.g. antibody and antigen). As used herein, the term "KD" refers to the equilibrium dissociation constant of the antibody-antigen interaction. As used herein, the term "$k_{on}$" refers to the rate constant at which an antibody binds to an antigen. As used herein, the term "$k_{off}$" refers to the rate constant at which an antibody dissociates from an antibody/antigen complex. "KD", "binding rate constant $k_{on}$" and "dissociation rate constant $k_{off}$" are commonly used to describe the affinity between a molecule (e.g. an antibody) and its binding partner (e.g. an antigen). Affinity, i.e. the tight degree at which a receptor binds a particular protein. Binding affinity is influenced by non-covalent intermolecular interactions such as hydrogen bonding, electrostatic interactions, hydrophobic and van der Waals forces between two molecules. In addition, the binding affinity between a ligand and its target molecule may be influenced by the presence of other molecules. Affinity can be analyzed by conventional methods known in the art, including the ELISA described herein.

The term "epitope" includes any protein determinant cluster that specifically binds to an antibody or T-cell receptor. Epitope determinant clusters typically consist of a molecule's chemically active surface groups (e.g. amino acid or sugar side chains, or a combination thereof) and often have specific three-dimensional structural features as well as specific charge characteristics.

The term "isolated" antibody is an antibody that has been identified and isolated from the components of the cell where the antibody expressed. Isolated antibodies include in situ antibodies inside of recombinant cells, where at least one component in natural environment of said antibody is absent. However, usually, the isolated antibody is prepared through at least one purification step.

"Sequence identity" between two polypeptides or nucleic acid sequences indicates the number of residues that are identical between said sequences as a percentage of the total number of residues, and is calculated based on the size of the smaller of the compared molecules. When calculating the percentage identity, the sequences being aligned are matched in such a way as to produce a maximum match between the sequences, with the gaps in the match (if present) being resolved by a specific algorithm. Preferred computer program methods for determining identity between two sequences include, but are not limited to, GCG program packages including GAP, BLASTP, BLASTN and FASTA (Altschul et al., 1990, J. Mol. Biol. 215:403-410). The above procedures are publicly available from the International Center for Biotechnology Information (NCBI) and other sources. The well-known Smith Waterman algorithm can also be used to determine identity.

The term "Fc receptor" or "FcR" refers to a receptor that binds to the Fc region of an antibody. Human FcRs of natural sequence are preferred, and preferably receptors that bind to IgG antibodies (gamma receptors), which include the FcγRI, FcγRII and FcγRIII isoforms, as well as variants of these receptors. All other FcRs are included in the term "FcR". The term also includes the neonatal receptor (FcRn), which is responsible for the transport of maternal IgG to the fetus (Guyer et al, Journal of Immunology 117:587 (1976) and Kim et al, Journal of Immunology 24:249 (1994)).

The term "neonatal Fc receptor", abbreviated as "FcRn", binds to the Fc region of IgG antibodies. The neonatal Fc receptor (FcRn) plays an important role in the metabolic fate of IgG-like antibodies in vivo. FcRn functions to rescue IgG from the lysosomal degradation pathway, thereby reducing its clearance in serum and lengthening its half-life. Therefore, the in vitro FcRn binding properties/characteristics of IgG are indicative of its in vivo pharmacokinetic properties in the circulation.

The term "effector function" refers to those biological activities attributable to the Fc region of an antibody, which vary from isotype to isotype. Examples of antibody effector functions include C1q binding and complement-dependent cytotoxicity (CDC), Fc receptor binding, antibody-dependent cell-mediated cytotoxicity (ADCC), antibody-dependent cellular phagocytosis (ADCP), cytokine secretion, immune complex-mediated uptake of antigen by antigen-presenting cells, cell surface receptors down-regulation (e.g. B-cell receptors) and B-cell activation.

The term "effector cell" refers to a leukocyte that expresses one or more FcRs and performs effector functions. In one aspect, said effector cells express at least FcγRIII and perform ADCC effector functions. Examples of human leukocytes that mediate ADCC include peripheral blood mononuclear cells (PBMCs), natural killer (NK) cells, monocytes, cytotoxic T cells and neutrophils. Effector cells can be isolated from natural sources, for example, blood. Effector cells are usually lymphocytes associated with effector phase and function to produce cytokines (helper T cells), kill cells infected by pathogens (cytotoxic T cells) or secrete antibodies (differentiated B cells).

"Immune cells" include cells that have a haematopoietic origin and play a role in the immune response. Immune cells include: lymphocytes, such as B cells and T cells; natural killer cells; and myeloid cells, such as monocytes, macrophages, eosinophils, mast cells, basophils and granulocytes.

"Antibody-dependent cell-mediated cytotoxicity" or "ADCC" refers to a form of cytotoxicity in which secreted Ig binds to Fcγ receptors presented on certain cytotoxic cells (e.g. NK cells, neutrophils and macrophages) allows these cytotoxic effector cells to specifically bind to target cells bearing antigens and subsequently kill said target cells using, for example, a cytotoxin. To assess the ADCC activity of the target antibody, in vitro ADCC assays can be performed, such as the in vitro ADCC assays documented in U.S. Pat. No. 5,500,362 or 5,821,337 or U.S. Pat. No. 6,737,056 (Presta). Useful effector cells for use in such assays include PBMCs and NK cells.

"Complement-dependent cytotoxicity" or "CDC" refers to the lysis of target cells in the presence of complement. The classic pathway for complement activation is initiated by binding the first component of the complement system (C1q) to an antibody (of the appropriate subclass) that binds to its corresponding antigen. To assess complement activation, a CDC assay can be performed, such as the CDC assay recited in Gazzano-Santoro et al., J. Immunol Methods 202:163 (1996). For example in U.S. Pat. No. 6,194,551 B1 and WO1999/51642, there described polypeptide variants having altered amino acid sequences of the Fc region (polypeptides having a variant Fc region) and polypeptide variants having enhanced or reduced C1q binding.

The terms "COSENTYX biosimilar" and "Taltz biosimilar" refer to antibodies prepared according to the structures of COSENTYX and Taltz, respectively.

Amino Acid Sequence of the Antibody of the Present Invention

The present invention used recombinant human IL17A protein to immunize mice, and then obtained the antibody clone IL17A-M069 that specifically bind to recombinant human IL17A protein by phage display library screening. The nucleotide sequences encoding the heavy and light chain variable regions of the IL17A-M069 scFv antibody were then inserted by PCR into pSTEP2 vectors harboring nucleotide sequence encoding the mouse IgG1 constant region or the mouse kappa light chain constant region respectively, and cultured for expression. The high purity antibodies were purified using a protein A purification column. ELISA showed that said murine antibody was able to block the binding of IL17A induced IL-6 secretion of HFF cells.

Then, using the classic method for humanized CDR transplantation, the human antibody light chain or heavy chain variable region whose sequence is closer to the sequence of mouse light chain or heavy chain variable region was elected as the template, the humanized light chain variable region (VL) and heavy chain variable region (VH) sequences were obtained by inserting each of the three CDRs (Table 1) of the murine antibody light chain or heavy chain into the variable regions of said human antibody. As the key sites of the mouse framework region are essential for maintaining the stability of the CDR activity, the key sites were reverse-mutated to the corresponding sequence of murine antibody. IL17A-H069 light chain/heavy chain expression vectors were obtained by whole gene synthesis, transfected into CHO-K1-GS deficient cells and cultured for expression, and the clones having high antibody expression were selected for further culture to obtain IL17A-H069 antibodies with high purity and high quality.

Nucleic Acids of the Present Invention

The present invention also relates to nucleic acid molecules encoding antibodies or portions thereof of the present invention. The sequences of these nucleic acid molecules include, but are not limited to, SEQ ID NOs: 2-7, 26-33, 36-37, 40-41 and 43.

The nucleic acid molecules of the present invention are not limited to the sequences disclosed herein, but also include variants thereof. Variants in the present invention may be described with reference to their physical properties in hybridization. It will be recognized by those of skill in the art that using nucleic acid hybridization techniques, nucleic acids can be used to identify their complements as well as their equivalents or homologues. It will also be recognized that hybridization can occur at less than 100% complementarity. However, given the appropriate choice of conditions, hybridization techniques can be used to distinguish said DNA sequences based on the structural relevance of the DNA sequence to a particular probe. For guidance on such conditions, see Sambrook et al., Molecular Cloning: A Laboratory Manual, 2nd Ed. Cold Spring Harbor Press, Cold Spring Harbor, N. Y., 1989 and Ausubel, F. M., Brent, R., Kingston, R. E., Moore, D. D., Sedman, J. G., Smith, J. A., & Struhl, K. eds. (1995). Current Protocols in Molecular Biology. New York: John Wiley and Sons.

Recombinant Vectors and Expression

The present invention also provides recombinant constructs comprising one or more nucleotide sequences of the present invention. The recombinant construct of the present invention is constructed by inserting the nucleic acid molecule encoding the antibody of the present invention into a vector such as a plasmid, phagemid, phage or viral vector.

The antibodies provided herein can be prepared by recombinantly expressing nucleotide sequences encoding light and heavy chains or portions thereof in a host cell. In order to recombinantly express the antibody, the host cell may be transfected with one or more recombinant expression vectors carrying nucleotide sequences encoding the light and/or heavy chains or portions thereof, so that said light and heavy chains are expressed in said host cell. Standard recombinant DNA methodologies are used to prepare and/or obtain nucleic acids encoding heavy and light chains, to incorporate these nucleic acids into recombinant expression vectors and to introduce said vectors into host cells, e.g. Sambrook, Fritsch and Maniatis (eds.), Molecular Cloning; A Laboratory Manual, Second Edition, Cold Spring Harbor, N.Y., (1989), Ausubel, F. M. et al. (eds.) Current Protocols in Molecular Biology, Greene Publishing Associates, (1989) and those documented in U.S. Pat. No. 4,816,397 by Boss et al.

Suitable host cells are prokaryotic and eukaryotic cells. Examples of prokaryotic host cells are bacteria and examples of eukaryotic host cells are yeast, insect or mammalian cells. It should be understood that the design of an expression vector including the selection of a regulatory sequence is determined by a number of factors, such as the choice of host cell, the level of expression of the desired protein and whether the expression is constitutive or inducible.

Bacterial Expression

By inserting a structural DNA sequence encoding the desired antibody together with appropriate translation initiation and termination signals and functional promoters into an operable reading frame, an expression vector for use in bacteria is constructed. The vector will contain one or more phenotypic selection markers and an origin of replication to ensure the maintenance of the vector and provide amplification in the host as needed. Suitable prokaryotic hosts for transformation include multiple species of E. coli, Bacillus subtilis, Salmonella typhimurium, as well as Pseudomonas, Streptomyces and Staphylococcus.

The bacterial vector may be, for example, phage-, plasmid- or phagemid-based. These vectors may contain selection markers and bacterial replication origins, which are derived from commercially available plasmids that usually contain elements of the well-known cloning vector pBR322 (ATCC 37017). After transforming an appropriate host strain and growing the host strain to an appropriate cell density, the selected promoter is de-repressed/induced by an appropriate method (for example, temperature change or chemical induction), and the cells are cultured for an additional time. The cells are usually harvested by centrifugation, disrupted by physical or chemical methods, and the resulting crude extract is retained for further purification.

In a bacterial system, a variety of expression vectors can be advantageously selected according to the intended use of the expressed protein. For example, when a large number of such proteins are to be produced for antibody production or for peptide library screening, for example, a vector that directs high-level expression of a fusion protein product to be easily purified may be required.

Mammalian Expression and Purification

Preferred regulatory sequences for expression in mammalian host cells include viral elements that direct high-level protein expression in mammalian cells, such as promoters and/or enhancers derived from cytomegalovirus (CMV) (e.g., CMV promoter/enhancer), promoters and/or enhancers of simian virus 40 (SV40) (e.g. SV40 promoter/enhancer), promoters and/or enhancers of adenovirus (e.g. adenovirus major late promoter (AdMLP) and promoters and/or enhancers of polyoma virus. For a further description of viral regulatory elements and their sequences, see, for example, U.S. Pat. No. 5,168,062 by Stinski, U.S. Pat. No. 4,510,245 by Bell et al., and U.S. Pat. No. 4,968,615 by Schaffner et al. The recombinant expression vector may also include an origin of replication and a selection marker (see, for example, U.S. Pat. Nos. 4,399,216, 4,634,665 and 5,179,017 by Axel et al). Suitable selection markers include genes that confer resistance to drugs such as G418, hygromycin, or methotrexate to host cells into which the vector has been introduced. For example, the dihydrofolate reductase (DHFR) gene confers resistance to methotrexate, while the neo gene confers resistance to G418.

The transfection of the expression vector into host cells can be performed using standard techniques such as electroporation, calcium phosphate precipitation, and DEAE-dextran transfection.

Suitable mammalian host cells for expressing the antibodies provided herein include Chinese Hamster Ovary (CHO cells) [including dhfr-CHO cells, as described in Urlaub and Chasin, (1980) Proc. Natl. Acad. Sci. USA 77:4216-4220, DHFR selection markers are employed, as described in, for example, R. J. Kaufman and P. A. Sharp (1982) Mol. Biol. 159:601-621], NSO myeloma cells, COS cells, and SP2 cells.

The antibodies of the present invention can be recovered and purified from recombinant cell culture by known methods, including but not limited to, ammonium sulfate or ethanol precipitation, acid extraction, protein A affinity chromatography, protein G affinity chromatography, anion or cation exchange chromatography, phosphocellulose chromatography, hydrophobic interaction chromatography, affinity chromatography, hydroxyapatite chromatography, and lectin chromatography. High performance liquid chromatography ("HPLC") can be used for purification as well. See, for example, Colligan, Current Protocols in Immunology, or Current Protocols in Protein Science, John Wiley & Sons, NY, N.Y., (1997-2001), for example, Chapters 1, 4, 6, 8, 9, and 10, each of which is incorporated herein by reference in its entirety.

Characteristics and Functions of the Antibody of the Present Invention

Characteristic analysis and function analysis of the humanized IL17A-H069 antibody of the present invention were performed. The analyses showed that the antibody of the present invention has the following advantages:

(1) A better specific binding to recombinant human IL17A protein than COSENTYX biosimilar (the $EC_{50}$ of the humanized IL17A-H069 antibody is 46 ng/ml, whereas the $EC_{50}$ of COSENTYX biosimilar is 74.8 ng/mL) (Example 4.1.1).

(2) A better specific binding to recombinant human IL17A/F dimer protein than COSENTYX biosimilar (the EC50 of the humanized IL17A-H069 antibody is 36.3 ng/ml; while the EC50 of COSENTYX biosimilar is 63.9 ng/ml) (Example 4.1.2).

(3) A good binding affinity (much higher than COSENTYX biosimilar; 2.88E-11 M vs. 9.55-11 M) and a favorable association rate (much faster than COSENTYX; $6.71E+05\ M^{-1}s^{-1}$ vs. $1.78E\pm05\ M^{-1}s^{-1}$) with recombinant human IL17A protein, a good binding affinity (higher than COSENTYX biosimilar; 5.37E-10M vs. 1.10-09 M) and a favorable association rate (faster than COSENTYX biosimilar; $1.44E+05\ M^{-1}s^{-1}$ vs. $8.00E+04\ M^{-1}s^{-1}$) (Example 4.1.3).

(4) No species cross-binding activity to mouse mIL17A protein (Example 4.1.4).

(5) Effectively binds recombinant human IL17A protein and effectively inhibits IL17A protein from binding to receptor IL17RA significantly better than COSENTYX biosimilar, but close to Taltz biosimilar (IC50: 0.50 μg/mL vs. 2.99 μg/mL vs. 0.50 μg/mL; maximum inhibition rate: 85.4% vs. 73.5% vs. 89.5% (Example 4.2.1).

(6) Effectively binds recombinant human IL17A/F dimer protein and effectively inhibits IL17A protein from binding to receptor IL17RA, better than COSENTYX biosimilar and Taltz biosimilar (IC50: 1.02 μg/mL vs. 1.2 μg/mL vs. 1.35 μg/mL; maximum inhibition rate: 92.3%, 87.9%, and 75%) (Example 4.2.2).

(7) Blocks IL17A, IL17A/F induced-IL-6 secretion of HFF cells; the activity of neutralizing IL17A is much higher than that of COSENTYX biosimilar ($EC_{50}$ 0.19 μg/mL vs. 0.22 μg/mL, maximum neutralization rate 94.6% vs. 51.6%) and the activity of neutralizing IL17A is close to that of Taltz biosimilar ($EC_{50}$ 0.20 μg/mL vs. 0.19 μg/mL, maximum neutralization rate 90.3% vs. 95.9%); the activity of neutralizing IL17A/F is also higher than that of COSENTYX biosimilar (EC$_{50}$ 1.19 μg/mL vs. 2.25 μg/mL, maximum neutralization rate 85.0% vs. 79.5%); and, the activity of neutralizing IL17A/F is better than Taltz biosimilar at low concentrations but close to Taltz biosimilar at high concentrations (EC$_{50}$: 0.83 μg/mL vs. 1.10 μg/mL, maximum neutralization rate: 72.90% vs. 76.3%) (Example 5.1).

(8) Being validated in the mouse psoriasis model, the antibody of the present invention effectively alleviates the progression of psoriasis and reduces symptoms with significantly better efficacy than Taltz biosimilar (Example 6).

(9) Pharmacokinetically, the antibody of the present invention has a faster absorption after subcutaneous injection and a longer half-life (Example 7).

Uses

The antibodies of the present invention can be used to treat colorectal cancer. The antibody of the present invention can also be used to prepare medicines for the treatment of said disorders.

Pharmaceutical Compositions

Antibodies of the present invention may be prepared with at least one other agent (e.g. a stable compound) to form pharmaceutical compositions comprising an antibody of the present invention and one or more pharmaceutically acceptable carriers, diluents or excipients. Optionally, the pharmaceutical compositions may contain additional therapeutic agents.

Kits

The present invention also relates to a pharmaceutical package and a kit comprising one or more containers, said containers contains the foregoing pharmaceutical compositions of the present invention. Accompanied with such containers may be specifications in the form prescribed by the governmental agency governing the manufacture, use or distribution of the drug or biological product, which reflect approval for human administration by the agency in which said product is manufactured, used or distributed.

Preparation and Storage

The pharmaceutical compositions of the present invention can be prepared in a manner known in the art, for example by conventional mixing, dissolution, granulation, pastille preparation, grinding, emulsification, encapsulation, embedding or lyophilization methods.

Having already prepared pharmaceutical compositions comprising compounds of the present invention formulated in an acceptable carrier, they may be placed in appropriate containers and labeled for the treatment of the condition indicated. Such labeling would include the amount, frequency and administration routes of the drug.

Combinations

The pharmaceutical compositions comprising the antibodies of the present invention described above are also combined with one or more other therapeutic agents, such as antineoplastic agents, wherein the resulting combination does not cause unacceptable adverse effects.

EXAMPLES

The present invention will be further understood with reference to the following non-limiting experimental examples. The experimental methods in the following examples, unless otherwise specified, are all conventional methods. The experimental materials used in the following examples, unless otherwise specified, were purchased from conventional biochemical reagent distributors.

Example 1: Screening of IL17A Antibodies 1.1 Immunization of Mice

Mice were immunized with IL17A according to the method described by StGroth et al. (de StGroth and Scheidegger 1980) with appropriate modifications. Recombinant human IL 17A protein (from SinoBiological, Inc, Cat. 10247-H07B) was used to immunize mice. The amino acid sequence of the IL17A protein (UniprotKB Q16552) is Met1-Ala155 (SEQ ID NO: 1). The recombinant human IL17A protein was mixed with aluminum phosphate adjuvant (where the first and fourth immunizations were performed with additional complete Freund's adjuvant CFA emulsified PBS, and the mouse was immunized subcutaneously in multiple sites at a dose of 50 μg/dose with the mixture for 4 times at intervals of 2 weeks, 3 weeks, and 3 weeks, respectively, Since the third immunization, blood was collected seven days after each immunization via the medial canthal plexus of the eyes. The serum titer of mouse anti-IL17A was measured by ELISA using coated recombinant human IL17A protein. The titer of the serum from the fourth immunization reached the target (ELISA, OD>1.0) after being diluted to 1:8000, and the mice were boosted intravenously with 25 μg recombinant human IL17A protein 75 days after the fourth immunization. 4 days later, the mice were executed and the spleen tissue was removed and frozen in liquid nitrogen.

1.2 Construction and Screening of Antibody Phage-Display Library

RNA was extracted from mouse spleen tissue using TriPure Isolation Reagent (from Roche, Cat. No. 11 667 165 001), and cDNAs were obtained by reverse transcription of RNA using a reverse transcription kit (from Invitrogen Cat. No. 18080-051). 2 pairs of primers were designed to amplify the sequence of the light chain variable region of the murine antibody and 1 pair of primers was designed to amplify the sequence of the heavy chain variable region, according to the method described in (Jones and Bendig 1991). The sequences encoding the light and heavy chain variable regions of the murine antibody were assembled into the nucleotide sequence encoding scFv by overlap extension PCR, then these two nucleotide sequence were linked by a linker (SEQ ID NO: 2) to assembled into a nucleotide sequence encoding scFv; then enzymatically ligated into the phage vector pComb3x (Sino Biological, Inc.) by restriction endonuclease Sfi I (Fermentas), and was electrotransformed into the competent X-Blue to construct the mouse scFv antibody phage-display library; the size of the library is (sic). The phage library enriched for positive anti-IL17A antibodies were obtained by screening with ELISA assay according to the process of phage antibody panning (Aitken 2002). The scFv antibodies that specifically bind the recombinant human IL17A protein were expressed by individual colony phages from the enriched library, and tested for their binding to recombinant human IL17A protein by ELISA. The nucleotide sequence of the scFv antibody of one colony was sequenced as SEQ ID NO: 3, and an antibody named as IL17A-M069 would derived from this colony after the steps in Example 1.3.

1.3 Production of Murine IL17A Monoclonal Antibodies

The nucleotide sequence encoding the scFv antibody heavy chain variable region (SEQ ID NO: 4) the heavy chain signal peptide sequence (SEQ ID NO: 43) and murine IgG1 heavy chain constant region sequence (SEQ ID NO: 6), was amplified and assembled with overlap extension PCR, was inserted into the Hind III+Xba I (Fermentas) digested pSTEP2 vector, thus the complete heavy chain (SEQ ID NO: 36) expression vector was obtained; similarly, the nucleotide sequence encoding the scFv antibody light chain variable region (SEQ ID NO: 5) the light chain signal peptide sequence (SEQ ID NO: 29) and murine kappa light chain constant region sequence (SEQ ID NO: 7) was amplified and assembled with overlap extension PCR, and was inserted into the Hind III+Xba I (Fermentas) digested pSTEP2 vector, thus the complete light chain (SEQ ID NO: 37) expression vector was obtained. The primers for assembling the heavy chain signal peptide, the heavy chain variable region and murine IgG1 heavy chain constant region were:

```
F1
                                    SEQ ID NO: 44
AAGCTTGCCGCCACCATGGGCTGGTCCCTGATTCTGC

F2
                                    SEQ ID NO: 45
GCTGGTCCCTGATTCTGCTGTTCCTGGTGGCTGTGGCT

F3
                                    SEQ ID NO: 46
TTCCTGGTGGCTGTGGCTACCAGGGTGCTGAGCCA

F4
                                    SEQ ID NO: 47
ACCAGGGTGCTGAGCCAGGCCCACCTTCAACAG

R1
                                    SEQ ID NO: 48
TCGTTTTGGCTGAGGAGACTGTGAGAGTGGT

F5
                                    SEQ ID NO: 49
TCTCCTCAGCCAAAACGACACCCCCATC

R2
                                    SEQ ID NO: 50
CACTATAGAATAGGGCCCTCTA
```

The primers for assembling the light chain signal peptide, the light chain variable region and murine kappa light chain constant region were:

```
F6
                                    SEQ ID NO: 51
CTGAAGCTTGCCGCCACCATGGGCTGGTCCTGTATCATCCTG

F7
                                    SEQ ID NO: 52
GCTGGTCCTGTATCATCCTGTTCCTGGTGGCTACAGCC

F8
                                    SEQ ID NO: 53
TTCCTGGTGGCTACAGCCACAGGAGTGCATAGCGACA

F9
                                    SEQ ID NO: 54
ACAGGAGTGCATAGCGACATTGTGATGTCACAGTC

R3
                                    SEQ ID NO: 55
CATCAGCCCGTTTTATTTCCAGCTTGGTCCC

F10
                                    SEQ ID NO: 56
AAATAAACGGGCTGATGCTGCACCAAC

R4
                                    SEQ ID NO: 57
CACTATAGAATAGGGCCCTCTAGA
```

293E cells (ATCC) were passaged with SCD4-4-TC2 medium (SinoBiological, Inc.) in a flask in a volume of 200 mL/flask with an initial inoculation density of $0.3 \sim 0.4 \times 10^6$ cells/mL, and the flask was cultured in a $CO_2$ shaker with a rotation speed of 175 rpm at 37° C., until the cell density reached $1.5 \sim 3 \times 10^6$ cells/mL. Then, the plasmids encoding the light chain and the heavy chain were mixed at a ratio of 1:1, and 100 μg of the mixed plasmid DNA and 800 μL of TF2 transfection reagent were added into the culture flask, which was then cultured in a shaker with a rotation speed of 175 rpm at 37° C. until the 7th day for collection. The culture medium was centrifuged at 4000 rpm for 25 min, the supernatant was collected and ⅕ supernatant volume of Stock buffer was added. After equilibrating the protein A chromatography column with a 5-10 time column volume of PBS buffer, the filtered culture supernatant was added to the chromatography column and again equilibrated for 5-10 times the column volume, then the column was eluted with sodium acetate buffer for collecting the sample. The sample was neutralized with Tris to obtain high purity murine monoclonal antibodies in a neutral solution.

Example 2: Function Analysis of Murine IL17A Monoclonal Antibodies 2.1 Murine Antibody IL17A-M069 Blocks IL17a-Induced IL-6 Secretion of HFF Cells As described by Beerli, Bauer et al. 2014, IL17A stimulates the cytokine IL-6 secretion of human foreskin fibroblasts HFF under in vitro conditions. Anti-IL17A antibody was added to this system to verify the neutralizing effect of IL17A antibody to IL17A by detecting the secretion of IL-6 from the HFF cells. HFF cells (ATCC, SCRC-1041) were inoculated in a 96-well plate in a cell density of $1 \times 10^4$/well and cultured overnight in DMEM medium containing 15% FBS. Different concentrations of IL17A-M069 antibodies and positive control Taltz biosimilar were added respectively in 10 μL/well the next day, then IL17A proteins at a final concentration of 50 ng/ml was added in 10 μL/well. The 96-well plate was incubated in a 37° C., 5% $CO_2$ cell incubator for 48 h, and the blank well B (no cells), negative control M' (cells inoculated, no antibody sample, IL17A added) and M (cells inoculated, no antibody sample and no IL17A) were used. After incubation, the supernatant was collected and the IL-6 secretion was measured by ELISA. The IL-6 secretion of the sample well and M' group well will minus the Il-6 secretion of M group well respectively to calculate the inhibition rate. The inhibition rate %=(1−IL-6 secretion of the sample wells)/IL-6 secretion of the M' group wells×100%. The standard curve was calculated using a statistical software, taking the antibody sample concentration as the horizontal coordinate and the IL-6 secretion as the vertical coordinate. The results are shown in FIG. 1, the murine antibody IL17A-M069 can block IL17A-induced IL-6 secretion of HFF cells, and the maximum inhibition rate and median inhibition concentration of IL17A-M069 on IL 17A were similar to those of the positive control Taltz biosimilar, the maximum inhibition rate of the murine antibody IL17A-M069 and Taltz biosimilar were 96.33% and 97.35% respectively, and the $EC_{50}$ were 243.3 ng/ml and 246.6 ng/ml respectively. Therefore, IL17A-M069 is a favorable antibody with good in vitro activity, subsequent humanization modification and function analyses were performed on IL17A-M069.

Example 3: Humanization and Production of IL17A Antibody IL17A-M069

On the ground of the function analysis results of the murine antibody IL17A-M069 in Example 2, humanization and production were performed accordingly.

3.1 Determination of CDR Sequences of the Light and Heavy Chains of IL17A Antibody IL17A-M069

The amino acid sequences of the heavy chain and light chain variable regions of the antibody IL17A-M069-scFv were deduced from the nucleotide sequence of the antibody IL17A-M069-scFv determined in Example 1.3, see SEQ ID NOs: 8/9.

The amino acid sequences of each of the three CDRs of the light and heavy chains of the murine antibody IL17A-M069-scFv were determined with reference to Kabat index (Abhinandan and Martin 2008, Dondelinger, Filée et al. 2018) and IMGT numbering (Lefranc 2014) systems, see Table 1 and SEQ ID NOs: 10-15. The aforementioned respective three CDRs of the light chain and the heavy chain were transplanted in the subsequent steps and retained in the finally obtained humanized antibody IL17A-H069, see Examples 3.2 and 3.3.

TABLE 1

CDR sequences of IL17A-M069 light chain and heavy chain

| Name | Sequence |
|---|---|
| LCDR1 | QSLLNRSNQKNYLA (SEQ ID NO: 10) |
| LCDR2 | FASTRES (SEQ ID NO: 11) |
| LCDR3 | QQHYTTPFT (SEQ ID NO: 12) |
| HCDR1 | GYTFTDYEMH (SEQ ID NO: 13) |
| HCDR2 | VIHPGGGGTAYNQKFKG (SEQ ID NO: 14) |
| HCDR3 | TRGDHDGRTDY (SEQ ID NO: 15) |

3.2 CDR Transplantation of the Murine Antibody

The humanization of the murine antibody was performed using the classic humanization method of CDR transplantation (Kettleborough, Saldanha et al. 1991). The human antibody light or heavy chain variable region, which is closer to the mouse light or heavy chain variable region (similarity>50%), was elected as the template, and each of three CDR sequences (SEQ ID NOs: 10-15) from the mouse light or heavy chain was inserted into the variable region of the human antibody to obtain the humanized light chain variable region (VL) or heavy chain variable region (VH) amino acid sequences respectively. The human template for the light chain variable region of IL 17A-M069 is IGKV4-1*01, which is 75.2% homologous to the light chain of IL17A-M069, and the human template for the heavy chain variable region is IGHV1-69-2*01, which is 65.3% homologous to the heavy chain of IL17A-M069.

3.3 Reverse-Mutations at the Framework Region of the Humanized Variable Region

As some key amino acids in the murine-derived framework region are essential to maintain the CDR spatial structure stability and the antibody binding activity, the key amino acids were reverse-mutated to the corresponding murine antibody amino acids until the antibody having stable spatial structure was obtained, the following sites were reversely mutated: according to the Kabat index system, in the light chain, Position 48 was reversely mutated to V, Position 49 was reversely mutated to D, and Position 87 was reversely mutated to F; while in the heavy chain, Position 24 was reversely mutated to A, and Position 43 was reversely mutated to H. The humanized antibody IL17A-H069 was obtained by CDR humanized transplantation and framework region reverse-mutations, and its heavy and light chain amino acid sequences are shown in SEQ ID NOs: 16/17, respectively; its heavy and light chain amino acid sequences in the form containing the signal peptides are respectively shown in SEQ ID NOs: 18/19, comprising sequentially linked heavy/light chain signal peptide sequences (SEQ ID NOs: 20/21); humanized antibody heavy chain/light chain variable region sequences (SEQ ID NOs: 22/23); humanized antibody IgG1 heavy chain constant region/human kappa light chain constant region sequences (SEQ ID NOs: 24/25), respectively.

3.4 Production of Humanized Monoclonal Antibody IL17A-H069

The nucleotide sequence (SEQ ID NO: 27) encoding the antibody IL17A-H069 light chain and the signal peptide, which contains the following nucleotide sequences encoding light chain signal peptide (SEQ ID NO: 29), the humanized antibody light chain variable region (SEQ ID NO: 31) and the human antibody kappa light chain constant region (SEQ ID NO: 33) connected in order, was PCR amplified and inserted into the self-developed pGS vector (Kpn I+Xba I) by in-fusion method, and the correct plasmids were verified by sequencing. Similarly, the nucleotide sequence (SEQ ID NO: 26) encoding the antibody IL17A-H069 heavy chain containing the signal peptide, which contains the following nucleotide sequences encoding heavy chain signal peptide (SEQ ID NO: 28), the humanized antibody heavy chain variable region (SEQ ID NO: 30) and the human IgG1 antibody heavy chain constant region (SEQ ID NO: 32) connected in order, was PCR amplified and inserted into the pGS vector (Nhe I+Not I) which had been verified to contain the light chain gene correctly by in-fusion method, and the correct vectors expressing both light and heavy chains of IL17A-H069 were verified by sequencing. These expression vectors are eukaryotic expression vectors containing the GS genes as the selection marker and the expression elements of the antibody light and heavy chains. These expression vectors were transfected into CHO-K1-GS-deficient cells and IL17A-H069 high expression cell lines were obtained by MSX screening. The clones with high antibody expression were selected by ELISA assay, and the high expression cell lines were selected by taking into account both the cell growth status and the key quality characteristics for antibody drugs. A serum-free suspension culture was used to culture the IL17A-H069 producing CHO cell line to obtain high purity and high quality IL17A-H069 antibodies.

Example 4: Analyses of Antigen Binding Affinity of the Humanized Antibody IL17A-H069

4.1 Analysis of Binding Affinity of Humanized Antibody to IL17A Protein
4.1.1 Binding of IL17A-H069 to Recombinant Human IL17A Protein Recombinant human IL17A protein (SinoBiological, Inc.) in different concentrations was coated on a 96-well plate overnight at 4° C. in 100 µL/well. The plate was washed the next day and blocked at room temperature for 1 h. After incubation with 100 µL of 2 µg/mL of COSENTYX biosimilar (SinoCelltech Co., Ltd.) and IL17A-H069 (SinoCelltech Co., Ltd.) respectively, the plate was washed to remove unbound antibodies, then incubated with goat anti-human IgG Fc/HRP and washed repeatedly, and the chromogenic substrate solution was added for color development. $OD_{450}$ was measured after the color development was stabilized. Taking the concentration of recombinant human IL17A protein as the horizontal coordinate and the $OD_{450}$ value as the vertical coordinate, the GraphPad Prism 6.0 software was used for data analysis and generating a dose-efficacy curve, the median effective concentration $EC_{50}$ values were calculated.

Figure 2:
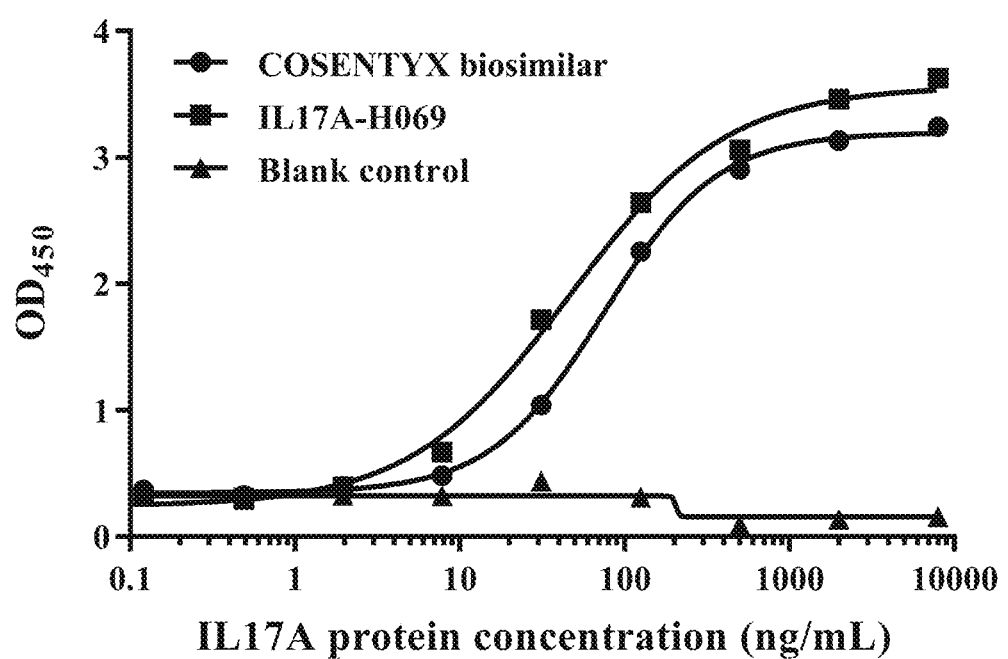
FIG. 2 shows the binding of IL17A-H069 to recombinant human IL17A protein.

The results shown in FIG. 2 demonstrate that the $EC_{50}$ value of COSENTYX biosimilar binding to recombinant human IL 17A protein is 74.8 ng/ml, $R^2=0.9993$; the $EC_{50}$ value of IL17A-H069 binding to recombinant human IL17A protein is 46 ng/mL, $R^2=0.9958$. This indicates that the ability of IL17A-H069 binding to recombinant human IL17A protein is slightly better than that of COSENTYX biosimilar.

4.1.2 Binding of IL17A-H069 to Recombinant Human IL17A/IL17F Protein

Recombinant human IL17A/F dimer protein (SinoBiological, Inc., CT047-HNAE) in different concentrations was coated on a 96-well plate overnight at 4° C. in 100 μL/well. The plate was washed the next day and blocked at room temperature for 1 h. After incubation with 100 μL of 2 μg/mL of COSENTYX biosimilar (SinoCelltech Co., Ltd.) and IL17A-H069 (SinoCelltech Co., Ltd.) respectively, the plate was washed to remove unbound antibodies, then incubated with goat anti-human IgG Fc/HRP and washed repeatedly, and the chromogenic substrate solution was added for color development. $OD_{450}$ was measured after the color development was stabilized. Taking the concentration of recombinant human IL17A/F protein as the horizontal coordinate and the $OD_{450}$ value as the vertical coordinate, the GraphPad Prism 6.0 software was used for data analysis and generating a dose-efficacy curve, the median effective concentration $EC_{50}$ values were calculated.

Figure 3:
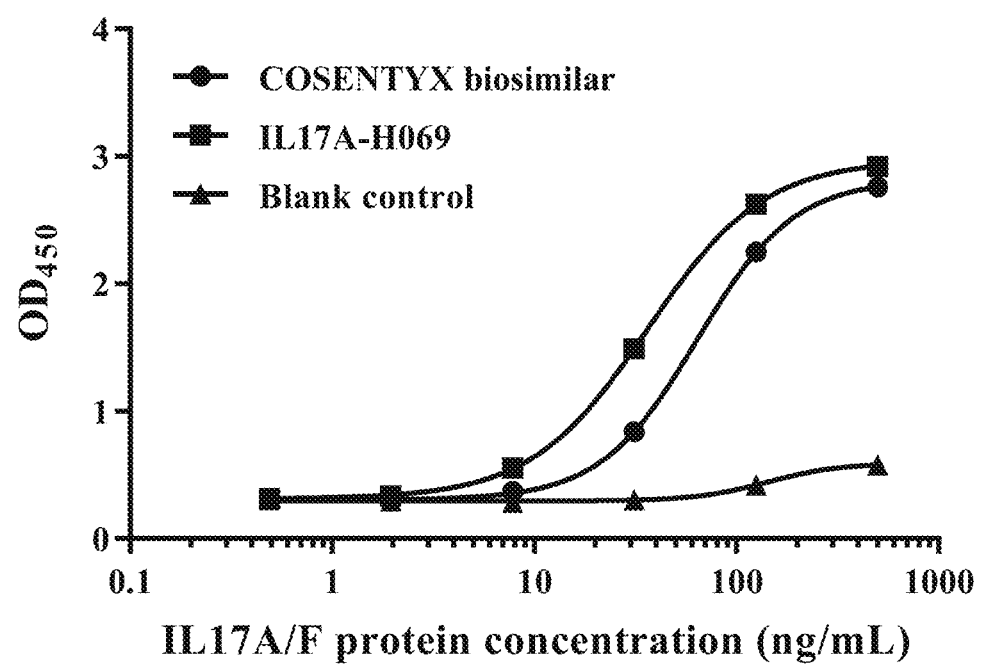
FIG. 3 shows the binding of IL17A-H069 to recombinant human IL17A/F protein.

The results shown in FIG. 3 demonstrate that the $EC_{50}$ value of COSENTYX biosimilar binding to recombinant human IL17A/F protein is 63.9 ng/mL, $R^2=0.9999$; the $EC_{50}$ value of IL17A-H069 binding to recombinant human IL17A/F protein is 36.3 ng/ml, $R^2=1.0$. This indicates that the ability of IL17A-H069 binding to recombinant human IL17A/F dimer protein is slightly better than that of COSENTYX biosimilar.

4.1.3 Assay of the Binding Affinities of IL17A-H069 to Recombinant Human IL17A Protein and Recombinant Human IL17a/IL17F Protein The affinities of IL17A-H069 at different concentrations (0.42 nM, 0.90 nM, 1.74 nM, and 3.47 nM) and positive control COSENTYX (Norvatis, SHM12) at different concentrations (0.90 nM, 1.74 nM, 3.47 nM, 6.94 nM, and 13.9 nM) to biotinylated IL7A or IL17A/F proteins were determined respectively using the Octet Biomolecular Interaction Assay System. The results in Table 2 showed that the binding affinity KD value of IL17A-H069 to recombinant human IL17A protein was 2.88E-11M, the association rate constant $k_{on}$ was 6.71E+05 $M^{-1}s^{-1}$ and the dissociation rate constant $k_{off}$ was 1.93E-05 $s^{-1}$; while the binding affinity KD value of COSENTYX to IL17A protein was 9.55E-11 M, with an association rate constant $k_{on}$ of 1.78E+05 $M^{-1}s^{-1}$ and a dissociation rate constant $k_{off}$ of 1.70E-05 $s^{-1}$. The binding affinity KD value of IL 17A-H069 to recombinant human IL17A/F protein was 5.37E-10M, the association rate constant $k_{on}$ was 1.44E+05 $M^{-1}s^{-1}$ and the dissociation rate constant $k_{off}$ was 7.72E-05 $s^{-1}$; while the binding affinity KD value of COSENTYX to IL17A/F protein was 1.10E-09 M, with an association rate constant $k_{on}$ of 8.00E+04 $M^{-1}s^{-1}$ and a dissociation rate constant $k_{off}$ of 8.79E-05 $s^{-1}$. The results showed that IL17A-H069 binds IL17A protein with stronger affinity than that of COSENTYX, the affinity of IL17A-H069 is about 3.32 times that of COSENTYX, and IL17A-H069 has a faster association rate, so IL17A-H069 has a stronger binding ability to IL17A protein than COSENTYX; IL17A-H069 binds IL17A/F protein with stronger affinity than that of COSENTYX, the affinity of IL17A-H069 is about 2.05 times the affinity of COSENTYX, and IL17A-H069 has a faster association rate, thus IL17A-H069 has a stronger binding ability to IL17A/F protein than COSENTYX.

TABLE 2

Octet assay of the binding of IL17A-H069 to IL17A, IL17A/F

| Protein | Sample | KD (M) | $k_{on}$ (1/Ms) | $k_{dis}$ (1/s) |
|---|---|---|---|---|
| IL17A | IL17A-H069 | 2.88E-11 | 6.71E+05 | 1.93E-05 |
|  | COSENTYX | 9.55E-11 | 1.78E+05 | 1.70E-05 |
| IL17A/F | IL17A-H069 | 5.37E-10 | 1.44E+05 | 7.72E-05 |
|  | COSENTYX | 1.10E-09 | 8.00E+04 | 8.79E-05 |

Figure 4:
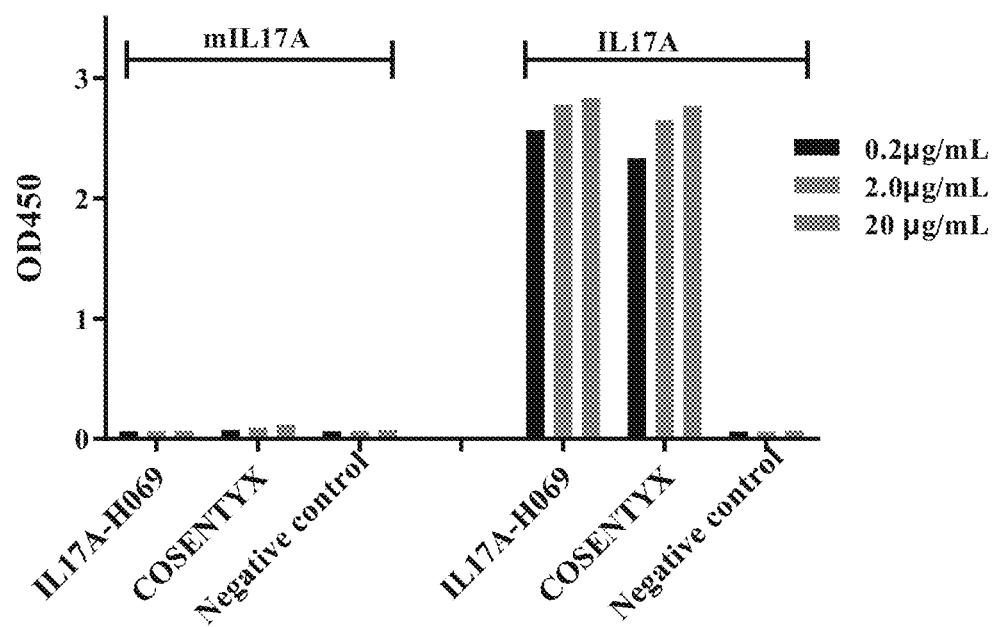
FIG. 4 shows the species cross-binding between IL17A-H069 and mouse IL17A protein.

4.1.4 Determination of Species Cross Reactivity of IL17A-H069 to Mouse IL17A Protein The recombinant human IL17A protein (Sino Biological, Inc.) and mouse mIL17A protein (Sino Biological, Inc.) at different concentrations was respectively coated on a 96-well plate in 100 μL per well overnight at 4° C. The plate was washed the next day, blocked at room temperature for 1 h. 100 μL of 2 μg/mL of IL17A-H069 (Sino Biological, Inc.), positive control COSENTYX (Norvatis, SHM12) and negative control antibody H7N9-R1 (SinoCelltech Co., Ltd.) were added respectively and incubated. The plate was washed to remove unbound antibodies. The plate was incubated with goat anti-human IgG Fc/HRP (Sino Biological, Inc.) and then repeatedly washed, and the chromogenic substrate solution was added for color development. $OD_{450}$ was measured after the color development was stabilized. The results shown in FIG. 4 demonstrate that IL17A-H069 has no cross-binding with mouse mIL 17A protein.

4.2 IL17A-H069 Blocks the Binding of IL17A Protein and IL17a/F Protein to the Receptor IL17RA 4.2.1 IL17A-H069 Blocks the Binding of IL17A Protein to the Receptor IL17RA IL17A protein at a concentration of 0.4 μg/mL was coated on a 96-well plate in 100 μL per well overnight at 4° C. The plate was washed the next day, blocked at room temperature for 1 h. 100 μL of 2 μg/mL of biotinylated protein IL17RA-His-biotin (Sino Biological, Inc.) was added in each well, then different concentrations of IL 17A-H069 (SinoCelltech Co., Ltd.), positive control COSENTYX (Norvatis, SHM12), positive control Taltz (Eli Lilly) and negative control antibody H7N9-R1 (SinoCelltech Co., Ltd.) were added respectively and incubated. The plate was washed to remove unbound antibodies. The plate was incubated with Streptavidin/HRP (Beijing ZSGB-Bio Co., Ltd., SA-5004) and then repeatedly washed, and the chromogenic substrate solution was added for color development. $OD_{450}$ was measured after the color development was stabilized, with each group tested in duplicate.

Taking the antibody concentration as the horizontal coordinate and the inhibition rate % as the vertical coordinate, the GraphPad Prism 6.0 software was used for data analysis and generating a chart, the IC50 values were calculated. Inhibition rate %=(OD blank-OD sample)/$OD_{blank} \times 100\%$, where OD blank represents the OD value of the samples with only IL17RA-His-biotin protein but no antibody added, OD sample represents the OD value of the samples with both IL17RA-His-biotin protein and antibody added.

Figure 5:
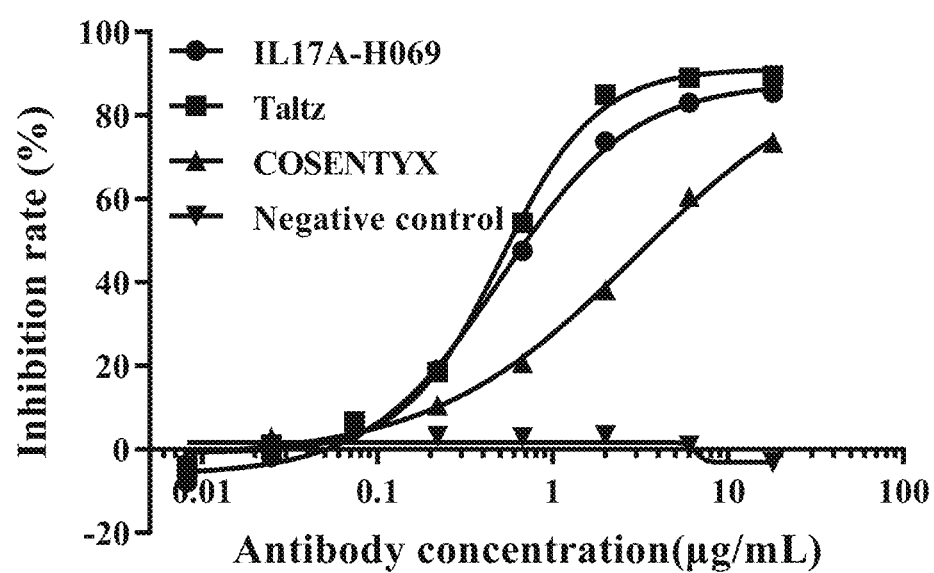
FIG. 5 shows that IL17A-H069 blocks the binding of IL17RA to IL17A protein.

The results shown in FIG. 5 demonstrate that the biotinylated IL17RA protein could effectively bind the coated recombinant human IL17A protein, and the antibody IL17A-

H069 could inhibit the binding of IL17A protein to the receptor IL17RA in a significantly better profile, presented by its inhibition curve, than positive control COSENTYX but the profile of IL17A-H069 inhibiting the binding of IL17A protein to the receptor IL17RA was close to that of positive control Taltz. The IC50 values of IL17A-H069, COSENTYX and Taltz were 0.50 μg/mL, 2.99 μg/mL, and 0.50 μg/mL respectively, and the maximum inhibition rates were 85.4%, 73.5%, and 89.5%, respectively.

4.2.2 IL17a-H069 Blocks the Binding of IL17a/F Protein to the Receptor IL17RA

The IL17RA-Fc protein (Sino Biological, Inc.) at a concentration of 5 μg/mL was coated on a 96-well plate in 100 μL per well overnight at 4° C. The plate was washed the next day, blocked at room temperature for 1 h. 100 μL of 0.8 μg/mL of IL17A/F-Biotin protein (Sino Biological, Inc.) was added in each well, then different concentrations of IL17A-H069 (SinoCelltech Co., Ltd.), positive control COSENTYX biosimilar (SinoCelltech Co., Ltd.), positive control Taltz biosimilar (SinoCelltech Co., Ltd.) and negative control antibody H7N9-R1 (SinoCelltech Co., Ltd.) were added respectively and incubated. The plate was washed to remove unbound antibodies. The plate was incubated with Streptavidin/HRP (Beijing ZSGB-Bio Co., Ltd., SA-5004) and then repeatedly washed, and the chromogenic substrate solution was added for color development. $OD_{450}$ was measured after the color development was stabilized.

Taking the antibody concentration as the horizontal coordinate and the inhibition rate % as the vertical coordinate, the GraphPad Prism 6.0 software was used for data analysis and generating a chart, the IC50 values were calculated. Inhibition rate %=(OD blank-OD sample)/OD blank×100%, where OD blank represents the OD value of the samples with only IL17A/F-biotin protein but no antibody added, OD sample represents the OD value of the samples with both IL17A/F-biotin protein and antibody added.

Figure 6:
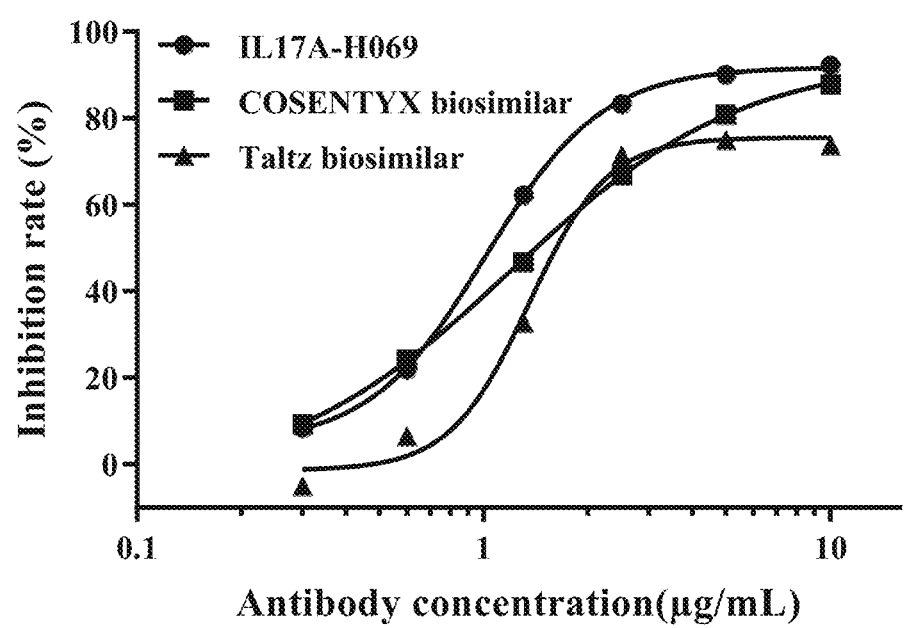
FIG. 6 shows that IL17A-H069 blocks the binding of IL17RA to IL17A/F protein.

The results shown in FIG. 6 demonstrate that IL17A/F-biotin protein could effectively bind the coated recombinant human IL17RA-Fc protein, and the addition of the antibody IL17A-H069 could effectively inhibit the IL17A/F protein from binding its receptor IL17RA-Fc. IL17A-H069 has a better inhibitory effect on the binding of IL17A/F protein to its receptor IL17RA-Fc than positive control COSENTYX biosimilar and positive control Taltz biosimilar. The IC50 values of IL17A-H069, COSENTYX biosimilar and Taltz biosimilar were 1.02 μg/mL, 1.20 μg/mL and 1.35 μg/mL, respectively, and the maximum inhibition rates were 92.3%, 87.9% and 75%, respectively.

Example 5: Function Analysis of the Humanized Antibody IL17A-H069

5.1 IL17A-H069 Blocks the IL17A-Induced or IL17A/F-Induced IL-6 Secretion of HFF Cells HFF cells were inoculated in a 96-well plate in a cell density of 1×10$^4$/well and cultured overnight in DMEM medium containing 15% FBS. Different concentrations of IL17A-H069 (SinoCelltech Co., Ltd.) and positive control COSENTYX (Norvatis) or positive control Taltz (Eli Lilly) were added respectively in 10 μL/well the next day, Subsequently, 10 μL of IL17A protein (Sino Biological, Inc. 12047-HNAS) at a final concentration of 50 ng/ml or IL17A/F protein (Sino Biological, Inc. CT047-HNAE) at a final concentration of 1 μg/mL was added to each well, respectively. The 96-well plate was incubated in a 37° C., 5% $CO_2$ cell incubator for 48 h, and the blank well B (no cells), negative control M' (cells inoculated, no antibody sample, IL17A or IL17A/F added) and M (cells inoculated, no antibody sample and no IL17A or IL17A/F) were used. After incubation, the supernatant was collected and the IL-6 secretion was measured by ELISA. The IL-6 secretion of the sample well and M' group well will minus the Il-6 secretion of M group well respectively to calculate the inhibition rate. The inhibition rate %=(1–IL-6 secretion of the sample wells)/IL-6 secretion of the M' group wells×100%. The standard curve was calculated using a statistical software, taking the antibody sample concentration as the horizontal coordinate and the IL-6 secretion as the vertical coordinate, and the 4-parameter logistic regression equation was used to fit the standard "S" curve to calculate the median effective concentration ($EC_{50}$) of the antibody sample.

In the above-described measurement, as shown in FIG. 7 and Table 3, the activity of IL17A-H069 in neutralizing IL17A ($EC_{50}$: 0.19 μg/mL, maximum neutralization rate: 94.6%) was much higher than the positive control COSENTYX ($EC_{50}$: 0.22 μg/mL, maximum neutralization rate: 51.6%) (FIG. 6A); in comparison with the positive control Taltz, the activity of IL17A-H069 in neutralizing IL17A ($EC_{50}$: 0.20 μg/mL, maximum neutralization rate: 90.3%) was close to the neutralization activity of Taltz ($EC_{50}$: 0.19 μg/mL, maximum neutralization rate: 95.9%) (FIG. 6C); the activity of IL17A-H069 in neutralizing IL17A/F ($EC_{50}$: 1.19 μg/mL, maximum neutralization rate: 85.0%) was also slightly higher than that of COSENTYX ($EC_{50}$: 2.25 μg/mL, maximum neutralization rate: 79.5%) (FIG. 6B). In comparison with the positive control Taltz, the activity of IL17A-H069 in neutralizing IL17A/F at high concentration ($EC_{50}$: 0.83 μg/mL, maximum neutralization rate: 72.90%) was close to that of Taltz ($EC_{50}$: 1.10 μg/mL, maximum neutralization rate: 76.3%), and superior to the positive control Taltz at low concentrations (FIG. 6D). In conclusion, IL17A-H069 has better biological activity of neutralizing IL17A and IL17A/F.

TABLE 3

$EC_{50}$ and maximum neutralization rate of IL17A-H069 blocking IL17A-induced IL6 secretion of HFF cells

| Group | Antibody | $EC_{50}$ (μg/mL) | Maximum neutralization rate (%) |
| --- | --- | --- | --- |
| Neutralization of IL17A | COSENTYX | 0.22 | 51.6 |
| | IL17A-H069 | 0.19 | 94.6 |
| | Taltz | 0.19 | 95.9 |
| | IL17A-H069 | 0.20 | 90.3 |
| Neutralization of IL17A/F | COSENTYX | 2.25 | 79.5 |
| | IL17A-H069 | 1.19 | 85.0 |
| | Taltz | 1.10 | 76.3 |
| | IL17A-H069 | 0.83 | 72.9 |

Example 6: In Vivo Efficacy of the Humanized Antibody in Mice 6.1 In Vivo Efficacy of IL17A-H069 in hPBMC Immune-Reconstituted Mouse Psoriasis (PsO) Model Using hPBMC from 3 donors, a total of 60 B-NDG mice (Biocytogen Pharmaceuticals (Beijing) Co., Ltd.) with humanized immune system were obtained (20 mice per donor's hPBMC). Peripheral blood was collected one week later and the percentage of human-derived cells was measured by flow cytometry. 20 mice had a percentage of human-derived cells between 0.04-1.5%, 31 mice had a percentage of 1.5-7%, and 8 mice had a percentage of >7%. Mice with the percentage of 1.5-7% were selected to establish IMQ (imiquimod)-induced mouse psoriasis model, based on which the efficacy of IL17A-H069 was evaluated.

The mice enrolled were grouped according to the following strategy: 5 unmodeled mice were grouped into the normal control group G1; 5 psoriasis modeled mice which were not administered with drug were grouped in G2 group, i.e. psoriasis model group; 7 psoriasis modeled mice which were administered with IL17A-H069 were grouped in G3 group; and 7 psoriasis modeled mice which were administered with positive control Taltz were grouped in G4 group. All mice backs were shaved to form an exposed area of about 2 cm×3 cm in size, and 100 mg IMQ cream was applied to the back of each mouse in G2, G3 and G4 groups and 10 mg IMQ cream was applied to ears of each mouse in G2, G3 and G4 groups every day for 10 days. The PASI scores of mice were recorded daily. According to the PASI scoring criteria, as shown in Table 4, the mice were given scores of 0-4 for the degree of erythema, scaling and dorsal skin thickening on the back of the lesion respectively, and the three scores were summed to obtain the total scores. For the G3 and G4 groups, the antibody administration was started on Day 1 of IMQ cream application, with the dose of 10 mpk, twice weekly.

TABLE 4

Criteria of PASI scoring (Severity index)

| Area | Erythema (E) | Induration (I) | Desquamation (D) | Area score (A) Actual area % |
|---|---|---|---|---|
| Head & neck (H) Upper extremity (U) Trunk, armpits, groin (T) Lower extremity and buttocks (L) | | 0: Absent 1: Mild 2: Moderate 3: Severe 4: Very Severe | | 0:0% 1:1%-9% 2:10%-29% 3:30%-49% 4:50%-69% 5:70%-89% 6:90%-100% |

Figure 8:
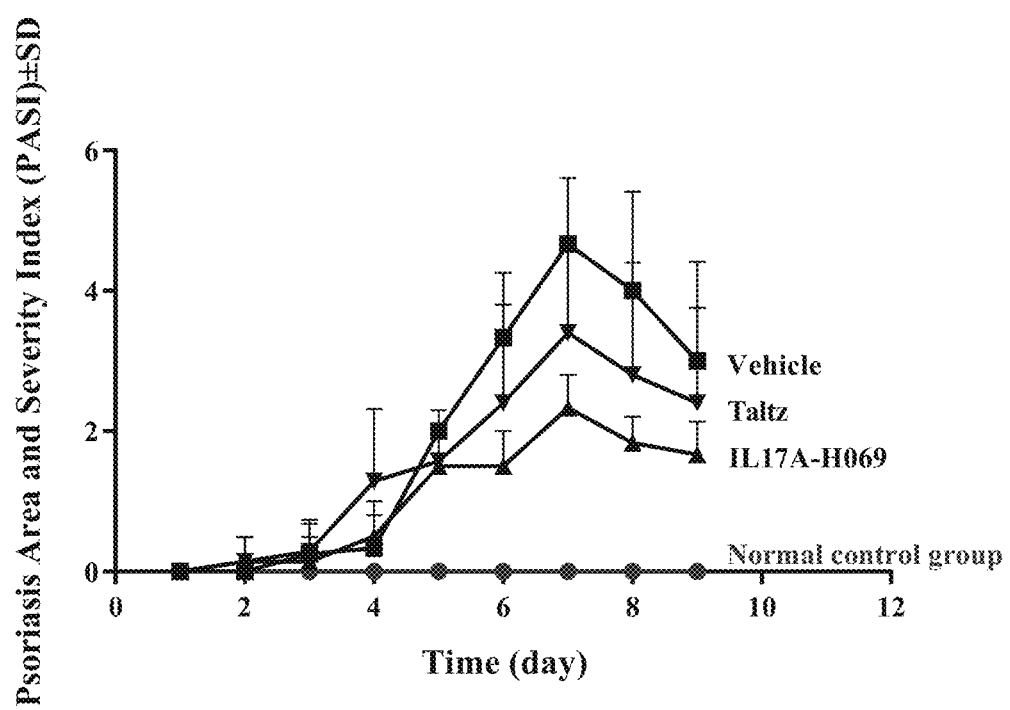
FIG. 8 shows the effect of IL17A-H069 on the Psoriasis Area and Severity Index PASI in a mouse psoriasis model.

PASI = 0.1(EH + IH + DH)AH + 0.2(EU + IU + DU)AU + 0.3(ET + IT + DT)AT + 0.4(EL + IL + DL)AL
PASI75: 75% improvement in severity index
PASI50: 50% improvement in severity index The results are shown in FIG. 8. Compared with the mice in normal control group, the PASI score was significantly higher in the mice in psoriasis model group, reflecting that this mouse model can characterize psoriasis to some extent; from Day 5, the PASI scores were significantly lower in the IL17A-H069 administered group compared with the psoriasis model group; and compared with the Taltz control group, IL17A-H069 had stronger in vivo efficacy in reducing psoriasis scores in mice, thus IL17A-H069 is effective in alleviating the onset of psoriasis (PsO) and reducing psoriasis symptoms in psoriasis model mice.

Example 7: In Vivo Pharmacokinetics of the Humanized Antibodies 7.1 Pharmacokinetics of Single Subcutaneous Injection of IL17A-H069 in Cynomolgus Monkeys In this example, single subcutaneous injections of IL17A-H069 antibodies were administered to cynomolgus monkeys at a dose of 1 mg/kg. Serum was collected before administration, and 1 h, 2 h, 4 h, 6 h, 8 h, 24 h, 48 h, 3 days, 4 days, 7 days, 10 days, 14 days, 17 days, 21 days, 24 days, 28 days, 31 days, and 35 days after administration, respectively. The established ELISA method was used to measure the drug concentration of IL17A-H069 in monkey serum, the pharmacokinetic parameters were calculated using the Non-compartmental Analysis (NCA) Phoenix-WinNonlin (Pharsight) 6.4 software. The dynamic pattern of in vivo drug changes profile after a single subcutaneous injection of IL17A-H069 was examined. Investigate the dynamic changes of the drug in the body after a single subcutaneous injection of IL17A-H069.

Figure 9:
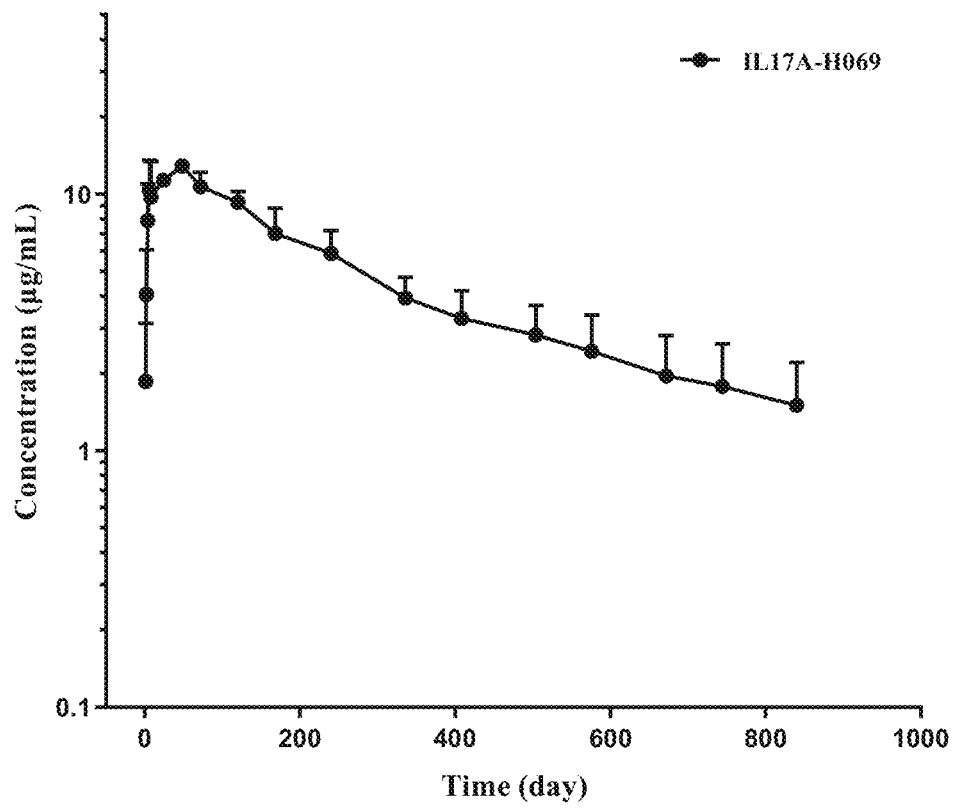
FIG. 9 shows the drug concentration-time curve of a single subcutaneous injection of IL17A-H069 in cynomolgus monkeys.

IL17A-H069 drug concentration changes over time are shown in Table 6 and FIG. 9. There was no significant gender difference in $C_{max}$ and $AUC_{last}$ between female and male mice (results not shown), and the half-life $t_{1/2}$ of IL17A-H069 was 353.66 h, the $T_{max}$ value was 34 h. In terms of in vivo exposure, $AUC_{last}$ of IL17A-H069 was 3846.86 h*μg/mL.

At the dose of 1 mg/kg, IL17A-H069 has a shorter $T_{max}$ and a longer $t_{1/2}$, so IL17A-H06 exhibits superior pharmacokinetics, including fast absorption after subcutaneous injection, long half-life, and better drug exposure, etc., thus laying the foundation for a longer dosing cycle.

TABLE 6

Pharmacokinetic parameters of a single subcutaneous injection in cynomolgus monkeys

| Antibody | Parameter | $t_{1/2}$ (h) | $T_{max}$ (h) | $C_{max}$ (μg/mL) | $C_{max}$ (μg/mL) | $AUC_{all}$ (h*μg/mL) |
|---|---|---|---|---|---|---|
| IL17A-H069 | Mean | 353.66 | 34.00 | 13.40 | 3846.86 | 3846.86 |
| | SD | 116.09 | 24.25 | 0.77 | 629.88 | 629.88 |

REFERENCES

Abhinandan, K. R. and A. C. Martin (2008). "Analysis and improvements to Kabat and structurally correct numbering of antibody variable domains." *Mol Immunol* 45 (14): 3832-3839.

Aitken, P. M. O. B. (2002). *Antibody Phage Display Methods and Protocols*, Humana Press.

Beerli, R. R., M. Bauer, A. Fritzer, L. B. Rosen, R. B. Buser, M. Hanner, M. Maudrich, M. Nebenfuehr, J. A. S. Toepfer, S. Mangold, A. Bauer, S. M. Holland, S. K. Browne and A. Meinke (2014). "Mining the human autoantibody repertoire: isolation of potent IL17A-neutralizing monoclonal antibodies from a patient with thymoma." *mAbs* 6 (6): 1608-1620.

Brembilla, N. C., L. Senra and W.-H. Boehncke (2018). "The IL-17 family of cytokines in psoriasis: IL-17A and beyond." *Frontiers in immunology* 9.

Bryksin, A. V. and I. Matsumura (2010). "Overlap extension PCR cloning: a simple and reliable way to create recombinant plasmids." *BioTechniques* 48 (6): 463-465.

de StGroth, S. F. and D. Scheidegger (1980). "Production of monoclonal antibodies: strategy and tactics." *J Immunol Methods* 35 (1-2): 1-21.

Dondelinger, M., P. Filée, E. Sauvage, B. Quinting, S. Muyldermans, M. Galleni and M. S. Vandevenne (2018). "Understanding the Significance and Implications of Antibody Numbering and Antigen-Binding Surface/Residue Definition." *Frontiers in immunology* 9:2278-2278.

Dubin, P. J. and J. K. Kolls (2009). "Interleukin-17A and Interleukin-17F: A Tale of Two Cytokines." *Immunity* 30 (1): 9-11.

Fala, L. (2016). "Cosentyx (Secukinumab): First IL-17A Antagonist Receives FDA Approval for Moderate-to-Severe Plaque Psoriasis." *American health & drug benefits* 9 (Spec Feature): 60-63.

Gu, C., L. Wu and X. Li (2013). "IL-17 family: cytokines, receptors and signaling." *Cytokine* 64 (2): 477-485.

Jones, S. T. and M. M. Bendig (1991). "Rapid PCR-cloning of full-length mouse immunoglobulin variable regions." *Biotechnology (N Y)* 9 (6): 579.

Kettleborough, C. A., J. Saldanha, V. J. Heath, C. J. Morrison and M. M. Bendig (1991). "Humanization of a mouse monoclonal antibody by CDR-grafting: the importance of framework residues on loop conformation." *Protein Eng* 4 (7): 773-783.

Lefranc, M.-P. (2014). "Immunoglobulin and T Cell Receptor Genes: IMGT® and the Birth and Rise of Immunoinformatics." *Frontiers in immunology* 5:22-22.

Liu, L., J. Lu, B. W. Allan, Y. Tang, J. Tetreault, C.-K. Chow, B. Barmettler, J. Nelson, H. Bina, L. Huang, V. J. Wroblewski and K. Kikly (2016). "Generation and characterization of ixekizumab, a humanized monoclonal antibody that neutralizes interleukin-17A." *Journal of inflammation research* 9:39-50.

Marinoni, B., A. Ceribelli, M. S. Massarotti and C. Selmi (2014). "The Th17 axis in psoriatic disease: pathogenetic and therapeutic implications." *Auto-immunity highlights* 5 (1): 9-19.

Mitra, A., S. Raychaudhuri and S. P. Raychaudhuri (2014). "IL-17 and IL-17R: an auspicious therapeutic target for psoriatic disease." *Actas dermo-sifiliograficas* 105:21-33.

Saldanha, J. W., A. C. Martin and O. J. Leger (1999). "A single backmutation in the human kIV framework of a previously unsuccessfully humanized antibody restores the binding activity and increases the secretion in cos cells." *Mol Immunol* 36 (11-12): 709-719.

Wang, E. A., E. Suzuki, E. Maverakis and I. E. Adamopoulos (2017). "Targeting IL-17 in psoriatic arthritis." *European journal of rheumatology* 4 (4): 272-277.

---

The invention claimed is:

1. An isolated anti-IL17A antibody or antigen-binding fragment thereof, comprising:
 a heavy chain variable region comprising:
  a heavy chain CDR1 region comprising the amino acid sequence of SEQ ID NO: 13;
  a heavy chain CDR2 region comprising the amino acid sequence of SEQ ID NO: 14; and
  a heavy chain CDR3 region comprising the amino acid sequence of SEQ ID NO: 15; and
 a light chain variable region comprising:
  a light chain CDR1 region comprising the amino acid sequence of SEQ ID NO: 10;
  a light chain CDR2 region comprising the amino acid sequence of SEQ ID NO: 11; and
  a light chain CDR3 region comprising the amino acid sequence of SEQ ID NO: 12.

2. The anti-IL17A antibody or antigen-binding fragment thereof according to claim 1, further comprising:
 a heavy chain variable region comprising one of:
  the amino acid sequence of SEQ ID NO: 22; and
  an amino acid sequence with at least 90%, at least 92%, at least 95%, at least 98% or at least 99% sequence identity to the amino acid sequence of SEQ ID NO: 22; and
 a light chain variable region comprising one of:
  the amino acid sequence of SEQ ID NO: 23; and
  an amino acid sequence with at least 90%, at least 92%, at least 95%, at least 98% or at least 99% sequence identity to the amino acid sequence of SEQ ID NO: 23.

3. The anti-IL17A antibody or antigen-binding fragment thereof according to claim 1, wherein said anti-IL17A antibody or antigen-binding fragment thereof comprises one of a humanized antibody and a chimeric antibody.

4. The anti-IL17A antibody or antigen-binding fragment thereof according to claim 1, further comprising:
 a heavy chain constant region comprising:
  an IgG1 heavy chain constant region comprising one of:
   the amino acid sequence one of SEQ ID NO: 24; and
   an amino acid sequence with at least 90%, at least 92%, at least 95%, at least 98%, or at least 99% sequence identity to the amino acid sequence of SEQ ID NO: 24; and
 a light chain constant region comprising:
  a human kappa light chain constant region comprising one of:
   the amino acid sequence one of SEQ ID NO: 25; and
   an amino acid sequence with at least 90%, at least 92%, at least 95%, at least 98%, or at least 99% sequence identity to the amino acid sequence of SEQ ID NO: 25.

5. The anti-IL17A antibody or antigen-binding fragment thereof according to claim 1, further comprising a signal peptide linked to at least one of the heavy chain variable region and the light chain variable region,
 wherein said signal peptide linked to the heavy chain variable region comprises one of:
  the amino acid sequence one of SEQ ID NO: 20; and
  an amino acid sequence with at least 90%, at least 92%, at least 95%, at least 98% or at least 99% sequence identity to the amino acid sequence of SEQ ID NO: 20; and
 wherein said signal peptide linked to the light chain variable region comprises one of:
  the amino acid sequence one of SEQ ID NO: 21; and
  an amino acid sequence with at least 90%, at least 92%, at least 95%, at least 98% or at least 99% sequence identity to the amino acid sequence of SEQ ID NO: 21.

6. The anti-IL17A antibody or antigen-binding fragment thereof according to claim 1, wherein said anti-IL17A antibody or antigen-binding fragment thereof further comprises one of an IgG antibody and an IgG1 antibody.

7. The anti-IL17A antibody or antigen-binding fragment thereof according to claim 1, wherein said anti-IL17A antibody or antigen-binding fragment thereof further comprises a monoclonal antibody.

8. The anti-IL17A antibody or antigen-binding fragment thereof according to claim 1, wherein a binding affinity KD of said anti-IL17A antibody or antigen-binding fragment thereof to a recombinant human IL17 protein is one of 0.1-10E-11M, 0.5-5E-11M, and 2.88E-11M.

9. The anti-IL17A antibody or antigen-binding fragment thereof according to claim 1, wherein a binding affinity KD of said anti-IL17A antibody or antigen-binding fragment thereof to a recombinant human IL17A/F protein is one of 0.1-10E-10M, 0.5-5E-10M, and 5.37E-10M.

10. The anti-IL17A antibody or antigen-binding fragment thereof according to claim 1, wherein said anti-IL17A antibody or antigen-binding fragment further comprises one of Fv, Fab, Fab', Fab'-SH, F(ab')2, and single chain antibody molecule, wherein the single chain antibody molecule comprises one of scFv, di-scFv, tri-scFv, diabody, and scFab.

11. An antibody-drug conjugate, comprising:
 (a) a therapeutic agent; and
 (b) an isolated anti-IL17A antibody or antigen-binding fragment thereof, comprising:

a heavy chain variable region comprising:
  a heavy chain CDR1 region comprising the amino acid sequence of SEQ ID NO: 13;
  a heavy chain CDR2 region comprising the amino acid sequence of SEQ ID NO: 14; and
  a heavy chain CDR3 region comprising the amino acid sequence of SEQ ID NO: 15; and
a light chain variable region comprising:
  a light chain CDR1 region comprising the amino acid sequence of SEQ ID NO: 10;
  a light chain CDR2 region comprising the amino acid sequence of SEQ ID NO: 11; and
  a light chain CDR3 region comprising the amino acid sequence of SEQ ID NO: 12,
wherein said anti-IL17A antibody or antigen-binding fragment thereof is connected with the therapeutic agent via a linker.

12. A nucleic acid encoding an anti-IL 17A antibody or antigen-binding fragment thereof, the anti-IL17A antibody or antigen-binding fragment thereof comprising:
  a heavy chain variable region comprising:
    a heavy chain CDR1 region comprising the amino acid sequence of SEQ ID NO: 13;
    a heavy chain CDR2 region comprising the amino acid sequence of SEQ ID NO: 14; and
    a heavy chain CDR3 region comprising the amino acid sequence of SEQ ID NO: 15; and
  a light chain variable region comprising:
    a light chain CDR1 region comprising the amino acid sequence of SEQ ID NO: 10;
    a light chain CDR2 region comprising the amino acid sequence of SEQ ID NO: 11; and
    a light chain CDR3 region comprising the amino acid sequence of SEQ ID NO: 12.

13. The nucleic acid according to claim 12, wherein the nucleic acid comprises:
  the nucleotide sequence one of SEQ ID NO: 30 encoding a heavy chain variable region; and
  the nucleotide sequence of SEQ ID NO: 31 encoding a light chain variable region.

* * * * *

SEQUENCE LISTING

<160> NUMBER OF SEQ ID NOS: 43

<210> SEQ ID NO 1
<211> LENGTH: 155
<212> TYPE: PRT
<213> ORGANISM: Artificial Sequence
<220> FEATURE:
<223> OTHER INFORMATION: Amino acid sequence of Met1-Ala155 of the human
      IL17A protein (UniProtKB Q16552)

<400> SEQUENCE: 1

Met Thr Pro Gly Lys Thr Ser Leu Val Ser Leu Leu Leu Leu Ser
1               5                   10                  15

Leu Glu Ala Ile Val Lys Ala Gly Ile Thr Ile Pro Arg Asn Pro Gly
            20                  25                  30

Cys Pro Asn Ser Glu Asp Lys Asn Phe Pro Arg Thr Val Met Val Asn
            35                  40                  45

Leu Asn Ile His Asn Arg Asn Thr Asn Thr Asn Pro Lys Arg Ser Ser
    50                  55                  60

Asp Tyr Tyr Asn Arg Ser Thr Ser Pro Trp Asn Leu His Arg Asn Glu
65                  70                  75                  80

Asp Pro Glu Arg Tyr Pro Ser Val Ile Trp Glu Ala Lys Cys Arg His
                85                  90                  95

Leu Gly Cys Ile Asn Ala Asp Gly Asn Val Asp Tyr His Met Asn Ser
            100                 105                 110

Val Pro Ile Gln Gln Glu Ile Leu Val Leu Arg Arg Glu Pro Pro His
        115                 120                 125

Cys Pro Asn Ser Phe Arg Leu Glu Lys Ile Leu Val Ser Val Gly Cys
    130                 135                 140

Thr Cys Val Thr Pro Ile Val His His Val Ala
145                 150                 155

<210> SEQ ID NO 2
<211> LENGTH: 54
<212> TYPE: DNA
<213> ORGANISM: Artificial Sequence
<220> FEATURE:
<223> OTHER INFORMATION: Nucleotide sequence of the linker used in the
      construction of the phage antibody library for the linkage of
      murine antibody scFv

<400> SEQUENCE: 2

```
tctagtggtg gcggtggttc gggcggtggt ggaggtggta gttctagatc ttcc        54
```

<210> SEQ ID NO 3
<211> LENGTH: 747
<212> TYPE: DNA
<213> ORGANISM: Artificial Sequence
<220> FEATURE:
<223> OTHER INFORMATION: Nucleotide sequence of murine antibody scFv
      used in the construction of antibody IL17A-M069

<400> SEQUENCE: 3

```
gacattgtga tgtcacagtc tccatcctcc ctggctatgt cagtaggaca gaaggtcact    60
atgaactgca agtccaatca gagccttttta aatagaagca atcaaaagaa ctatttggcc   120
tggtaccagc agaaaccagg acagtctcct aaacttctgg tagactttgc atccactagg   180
gaatctgggg tccctgatcg cttcataggc agtggatctg ggacagattt cagtcttacc   240
atcagcagtg tgcaggctga ggacctggca gattacttct gtcagcaaca ttataccact   300
ccattcacgt tcggctcggg gaccaagctg gaaataaaat ctagtggtgg cggtggttcg   360
ggcggtggtg gaggtggtag ttctagatct tcccaggccc accttcaaca gtctggggct   420
gagctggtga ggcctggggc ttcagtgaag ctgtcctgca aggctttggg ctacacattt   480
actgactatg aaatgcactg ggtgaaacag acacctgtgc atggcctgga atggattgga   540
gttattcatc aggaggtggg tggtacggcc tacaatcaga agttcaaggg caaggccaca   600
ctgactgcag acaagtcctc cagtacagcc tacatggagc tcagcagcct gacatctgag   660
gactctgctg tctattactg tacaagaggg gatcacgacg gaaggactga ctactggggc   720
caaggcacca ctctcacagt ctcctca                                       747
```

<210> SEQ ID NO 4
<211> LENGTH: 354
<212> TYPE: DNA
<213> ORGANISM: Artificial Sequence
<220> FEATURE:
<223> OTHER INFORMATION: Nucleotide sequence of the heavy chain variable
      region of murine antibody IL17A-M069

<400> SEQUENCE: 4

```
caggcccacc ttcaacagtc tggggctgag ctggtgaggc ctggggcttc agtgaagctg    60
tcctgcaagg ctttgggcta cacatttact gactatgaaa tgcactgggt gaaacagaca   120
cctgtgcatg gcctggaatg gattggagtt attcatccag aggtggtgg tacggcctac   180 aatcagaagt tcaagggcaa ggccacactg actgcagaca gtcctccag tacagcctac   240 atggagctca gcagcctgac atctgaggac tctgctgtct attactgtac aagaggggat   300
cacgacggaa ggactgacta ctggggccaa ggcaccactc tcacagtctc ctca          354
```

<210> SEQ ID NO 5
<211> LENGTH: 339
<212> TYPE: DNA
<213> ORGANISM: Artificial Sequence
<220> FEATURE:
<223> OTHER INFORMATION: Nucleotide sequence of the light chain variable
      region of murine antibody IL17A-M069

<400> SEQUENCE: 5

```
gacattgtga tgtcacagtc tccatcctcc ctggctatgt cagtaggaca gaaggtcact    60
atgaactgca agtccaatca gagccttttta aatagaagca atcaaaagaa ctatttggcc   120
tggtaccagc agaaaccagg acagtctcct aaacttctgg tagactttgc atccactagg   180
```

| | |
|---|---|
| gaatctgggg tccctgatcg cttcataggc agtggatctg ggacagattt cagtcttacc | 240 |
| atcagcagtg tgcaggctga ggacctggca gattacttct gtcagcaaca ttataccact | 300 |
| ccattcacgt tcggctcggg gaccaagctg gaaataaaa | 339 |

<210> SEQ ID NO 6
<211> LENGTH: 975
<212> TYPE: DNA
<213> ORGANISM: Artificial Sequence
<220> FEATURE:
<223> OTHER INFORMATION: Nucleotide sequence of mouse IgG1 heavy chain
      constant region

<400> SEQUENCE: 6

| | |
|---|---|
| gccaaaacga cacccccatc tgtctatcca ctggcccctg gatctgctgc ccaaactaac | 60 |
| tccatggtga ccctgggatg cctggtcaag ggctatttcc ctgagccagt gacagtgacc | 120 |
| tggaactctg gatccctgtc agcggtgtg cacaccttcc cagctgtcct gcagtctgac | 180 |
| ctctacactc tgagcagctc agtgactgtc ccctccagca cctggcccag cgagaccgtc | 240 |
| acctgcaacg ttgcccaccc ggccagcagc accaaggtgg acaagaaaat tgtgcccagg | 300 |
| gattgtggtt gtaagccttg catatgtaca gtcccagaag tatcatctgt cttcatcttc | 360 |
| cccccaaagc ccaaggatgt gctcaccatt actctgactc taaggtcac gtgtgttgtg | 420 |
| gtagacatca gcaaggatga tcccgaggtc cagttcagct ggtttgtaga tgatgtggag | 480 |
| gtgcacacag ctcagacgca accccgggag gagcagttca acagcacttt ccgctcagtc | 540 |
| agtgaacttc ccatcatgca ccaggactgg ctcaatggca aggagttcaa atgcagggtc | 600 |
| aacagtgcag ctttccctgc ccccatcgag aaaaccatct ccaaaaccaa aggcagaccg | 660 |
| aaggctccac aggtgtacac cattccacct cccaaggagc agatggccaa ggataaagtc | 720 |
| agtctgacct gcatgataac agacttcttc cctgaagaca ttactgtgga gtggcagtgg | 780 |
| aatgggcagc cagcggagaa ctacaagaac actcagccca tcatggacac agatggctct | 840 |
| tacttcgtct acagcaagct caatgtgcag aagagcaact gggaggcagg aaatactttc | 900 |
| acctgctctg tgttacatga gggcctgcac aaccaccata ctgagaagag cctctcccac | 960 |
| tctcctggta aataa | 975 |

<210> SEQ ID NO 7
<211> LENGTH: 325
<212> TYPE: DNA
<213> ORGANISM: Artificial Sequence
<220> FEATURE:
<223> OTHER INFORMATION: Nucleotide sequence of mouse kappa light chain
      constant region

<400> SEQUENCE: 7

| | |
|---|---|
| cgggctgatg ctgcaccaac tgtatccatc ttcccaccat ccagtgagca gttaacatct | 60 |
| ggaggtgcct cagtcgtgtg cttcttgaac aacttctacc ccaaagacat caatgtcaag | 120 |
| tggaagattg atggcagtga acgacaaaat ggcgtcctga cagttggac tgatcaggac | 180 |
| agcaaagaca gcacctacag catgagcagc accctcacgt tgaccaagga cgagtatgaa | 240 |
| cgacataaca gctatacctg tgaggccact cacaagacat caacttcacc cattgtcaag | 300 |
| agcttcaaca ggaatgagtg ttaaa | 325 |

<210> SEQ ID NO 8
<211> LENGTH: 118
<212> TYPE: PRT

<213> ORGANISM: Artificial Sequence
<220> FEATURE:
<223> OTHER INFORMATION: Amino acid sequence of the heavy chain variable
      region of murine antibody IL17A-M069

<400> SEQUENCE: 8

```
Gln Ala His Leu Gln Gln Ser Gly Ala Glu Leu Val Arg Pro Gly Ala
1               5                   10                  15

Ser Val Lys Leu Ser Cys Lys Ala Leu Gly Tyr Thr Phe Thr Asp Tyr
            20                  25                  30

Glu Met His Trp Val Lys Gln Thr Pro Val His Gly Leu Glu Trp Ile
        35                  40                  45

Gly Val Ile His Pro Gly Gly Gly Thr Ala Tyr Asn Gln Lys Phe
    50                  55                  60

Lys Gly Lys Ala Thr Leu Thr Ala Asp Lys Ser Ser Thr Ala Tyr
65                  70                  75                  80

Met Glu Leu Ser Ser Leu Thr Ser Glu Asp Ser Ala Val Tyr Tyr Cys
            85                  90                  95

Thr Arg Gly Asp His Asp Gly Arg Thr Asp Tyr Trp Gly Gln Gly Thr
            100                 105                 110

Thr Leu Thr Val Ser Ser
        115
```

<210> SEQ ID NO 9
<211> LENGTH: 113
<212> TYPE: PRT
<213> ORGANISM: Artificial Sequence
<220> FEATURE:
<223> OTHER INFORMATION: Amino acid sequence of the light chain variable
      region of murine antibody IL17A-M069

<400> SEQUENCE: 9

```
Asp Ile Val Met Ser Gln Ser Pro Ser Ser Leu Ala Met Ser Val Gly
1               5                   10                  15

Gln Lys Val Thr Met Asn Cys Lys Ser Asn Gln Ser Leu Leu Asn Arg
            20                  25                  30

Ser Asn Gln Lys Asn Tyr Leu Ala Trp Tyr Gln Gln Lys Pro Gly Gln
        35                  40                  45

Ser Pro Lys Leu Leu Val Asp Phe Ala Ser Thr Arg Glu Ser Gly Val
    50                  55                  60

Pro Asp Arg Phe Ile Gly Ser Gly Ser Gly Thr Asp Phe Ser Leu Thr
65                  70                  75                  80

Ile Ser Ser Val Gln Ala Glu Asp Leu Ala Asp Tyr Phe Cys Gln Gln
            85                  90                  95

His Tyr Thr Thr Pro Phe Thr Phe Gly Ser Gly Thr Lys Leu Glu Ile
            100                 105                 110

Lys
```

<210> SEQ ID NO 10
<211> LENGTH: 14
<212> TYPE: PRT
<213> ORGANISM: Artificial Sequence
<220> FEATURE:
<223> OTHER INFORMATION: Amino acid sequence of the light chain CDR1 of
      murine antibody IL17A-M069/humanized antibody IL17A-H069

<400> SEQUENCE: 10

```
Gln Ser Leu Leu Asn Arg Ser Asn Gln Lys Asn Tyr Leu Ala
1               5                   10
```

<210> SEQ ID NO 11
<211> LENGTH: 7
<212> TYPE: PRT
<213> ORGANISM: Artificial Sequence
<220> FEATURE:
<223> OTHER INFORMATION: Amino acid sequence of the light chain CDR2 of
      murine antibody IL17A-M069/humanized antibody IL17A-H069

<400> SEQUENCE: 11

Phe Ala Ser Thr Arg Glu Ser
1               5

<210> SEQ ID NO 12
<211> LENGTH: 9
<212> TYPE: PRT
<213> ORGANISM: Artificial Sequence
<220> FEATURE:
<223> OTHER INFORMATION: Amino acid sequence of the light chain CDR3 of
      murine antibody IL17A-M069/humanized antibody IL17A-H069

<400> SEQUENCE: 12

Gln Gln His Tyr Thr Thr Pro Phe Thr
1               5

<210> SEQ ID NO 13
<211> LENGTH: 10
<212> TYPE: PRT
<213> ORGANISM: Artificial Sequence
<220> FEATURE:
<223> OTHER INFORMATION: Amino acid sequence of the heavy chain CDR1 of
      murine antibody IL17A-M069/humanized antibody IL17A-H069

<400> SEQUENCE: 13

Gly Tyr Thr Phe Thr Asp Tyr Glu Met His
1               5                   10

<210> SEQ ID NO 14
<211> LENGTH: 17
<212> TYPE: PRT
<213> ORGANISM: Artificial Sequence
<220> FEATURE:
<223> OTHER INFORMATION: Amino acid sequence of the heavy chain CDR2 of
      murine antibody IL17A-M069/humanized antibody IL17A-H069

<400> SEQUENCE: 14

Val Ile His Pro Gly Gly Gly Gly Thr Ala Tyr Asn Gln Lys Phe Lys
1               5                   10                  15

Gly

<210> SEQ ID NO 15
<211> LENGTH: 11
<212> TYPE: PRT
<213> ORGANISM: Artificial Sequence
<220> FEATURE:
<223> OTHER INFORMATION: Amino acid sequence of the heavy chain CDR3 of
      murine antibody IL17A-M069/humanized antibody IL17A-H069

<400> SEQUENCE: 15

Thr Arg Gly Asp His Asp Gly Arg Thr Asp Tyr
1               5                   10

<210> SEQ ID NO 16
<211> LENGTH: 447
<212> TYPE: PRT
<213> ORGANISM: Artificial Sequence
<220> FEATURE:
<223> OTHER INFORMATION: Amino acid sequence of the heavy chain of humanized antibody IL17A-H069

<400> SEQUENCE: 16

```
Glu Val Gln Leu Val Gln Ser Gly Ala Glu Val Lys Lys Pro Gly Ala
1               5                   10                  15

Thr Val Lys Ile Ser Cys Lys Ala Ser Gly Tyr Thr Phe Thr Asp Tyr
                20                  25                  30

Glu Met His Trp Val Gln Gln Ala Pro Gly His Gly Leu Glu Trp Met
            35                  40                  45

Gly Val Ile His Pro Gly Gly Gly Thr Ala Tyr Asn Gln Lys Phe
        50                  55                  60

Lys Gly Arg Val Thr Ile Thr Ala Asp Thr Ser Thr Asp Thr Ala Tyr
65                  70                  75                  80

Met Glu Leu Ser Ser Leu Arg Ser Glu Asp Thr Ala Val Tyr Tyr Cys
                85                  90                  95

Thr Arg Gly Asp His Asp Gly Arg Thr Asp Tyr Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
        195                 200                 205

Asn Thr Lys Val Asp Lys Lys Val Glu Pro Lys Ser Cys Asp Lys Thr
    210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
        275                 280                 285

Lys Thr Lys Pro Arg Glu Glu Gln Tyr Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Arg Asp Glu Leu Thr Lys Asn Gln Val Ser Leu Thr Cys
        355                 360                 365

Leu Val Lys Gly Phe Tyr Pro Ser Asp Ile Ala Val Glu Trp Glu Ser
    370                 375                 380

Asn Gly Gln Pro Glu Asn Asn Tyr Lys Thr Thr Pro Pro Val Leu Asp
385                 390                 395                 400
```

Ser Asp Gly Ser Phe Phe Leu Tyr Ser Lys Leu Thr Val Asp Lys Ser
            405                 410                 415

Arg Trp Gln Gln Gly Asn Val Phe Ser Cys Ser Val Met His Glu Ala
        420                 425                 430

Leu His Asn His Tyr Thr Gln Lys Ser Leu Ser Leu Ser Pro Gly
        435                 440                 445

<210> SEQ ID NO 17
<211> LENGTH: 220
<212> TYPE: PRT
<213> ORGANISM: Artificial Sequence
<220> FEATURE:
<223> OTHER INFORMATION: Amino acid sequence of the light chain of
      humanized antibody IL17A-H069

<400> SEQUENCE: 17

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Arg
            20                  25                  30

Ser Asn Gln Lys Asn Tyr Leu Ala Trp Tyr Gln Gln Lys Pro Gly Gln
        35                  40                  45

Pro Pro Lys Leu Leu Val Asp Phe Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Phe Cys Gln Gln
                85                  90                  95

His Tyr Thr Thr Pro Phe Thr Phe Gly Pro Gly Thr Lys Val Asp Ile
            100                 105                 110

Lys Arg Thr Val Ala Ala Pro Ser Val Phe Ile Phe Pro Pro Ser Asp
            115                 120                 125

Glu Gln Leu Lys Ser Gly Thr Ala Ser Val Val Cys Leu Leu Asn Asn
    130                 135                 140

Phe Tyr Pro Arg Glu Ala Lys Val Gln Trp Lys Val Asp Asn Ala Leu
145                 150                 155                 160

Gln Ser Gly Asn Ser Gln Glu Ser Val Thr Glu Gln Asp Ser Lys Asp
                165                 170                 175

Ser Thr Tyr Ser Leu Ser Ser Thr Leu Thr Leu Ser Lys Ala Asp Tyr
            180                 185                 190

Glu Lys His Lys Val Tyr Ala Cys Glu Val Thr His Gln Gly Leu Ser
            195                 200                 205

Ser Pro Val Thr Lys Ser Phe Asn Arg Gly Glu Cys
    210                 215                 220

<210> SEQ ID NO 18
<211> LENGTH: 466
<212> TYPE: PRT
<213> ORGANISM: Artificial Sequence
<220> FEATURE:
<223> OTHER INFORMATION: Amino acid sequence of the heavy chain of
      humanized antibody IL17A-H069 containing signal peptide

<400> SEQUENCE: 18

Met Glu Leu Gly Leu Ser Trp Ile Phe Leu Leu Ala Ile Leu Lys Gly
1               5                   10                  15

Val Gln Cys Glu Val Gln Leu Val Gln Ser Gly Ala Glu Val Lys Lys
            20                  25                  30

```
Pro Gly Ala Thr Val Lys Ile Ser Cys Lys Ala Ser Gly Tyr Thr Phe
            35                  40                  45
Thr Asp Tyr Glu Met His Trp Val Gln Gln Ala Pro Gly His Gly Leu
 50                  55                  60
Glu Trp Met Gly Val Ile His Pro Gly Gly Gly Thr Ala Tyr Asn
 65                  70                  75                  80
Gln Lys Phe Lys Gly Arg Val Thr Ile Thr Ala Asp Thr Ser Thr Asp
                 85                  90                  95
Thr Ala Tyr Met Glu Leu Ser Ser Leu Arg Ser Glu Asp Thr Ala Val
                100                 105                 110
Tyr Tyr Cys Thr Arg Gly Asp His Asp Gly Arg Thr Asp Tyr Trp Gly
            115                 120                 125
Gln Gly Thr Leu Val Thr Val Ser Ser Ala Ser Thr Lys Gly Pro Ser
        130                 135                 140
Val Phe Pro Leu Ala Pro Ser Ser Lys Ser Thr Ser Gly Gly Thr Ala
145                 150                 155                 160
Ala Leu Gly Cys Leu Val Lys Asp Tyr Phe Pro Glu Pro Val Thr Val
                165                 170                 175
Ser Trp Asn Ser Gly Ala Leu Thr Ser Gly Val His Thr Phe Pro Ala
            180                 185                 190
Val Leu Gln Ser Ser Gly Leu Tyr Ser Leu Ser Ser Val Val Thr Val
        195                 200                 205
Pro Ser Ser Ser Leu Gly Thr Gln Thr Tyr Ile Cys Asn Val Asn His
210                 215                 220
Lys Pro Ser Asn Thr Lys Val Asp Lys Lys Val Glu Pro Lys Ser Cys
225                 230                 235                 240
Asp Lys Thr His Thr Cys Pro Pro Cys Pro Ala Pro Glu Leu Leu Gly
                245                 250                 255
Gly Pro Ser Val Phe Leu Phe Pro Pro Lys Pro Lys Asp Thr Leu Met
            260                 265                 270
Ile Ser Arg Thr Pro Glu Val Thr Cys Val Val Val Asp Val Ser His
        275                 280                 285
Glu Asp Pro Glu Val Lys Phe Asn Trp Tyr Val Asp Gly Val Glu Val
290                 295                 300
His Asn Ala Lys Thr Lys Pro Arg Glu Glu Gln Tyr Asn Ser Thr Tyr
305                 310                 315                 320
Arg Val Val Ser Val Leu Thr Val Leu His Gln Asp Trp Leu Asn Gly
                325                 330                 335
Lys Glu Tyr Lys Cys Lys Val Ser Asn Lys Ala Leu Pro Ala Pro Ile
            340                 345                 350
Glu Lys Thr Ile Ser Lys Ala Lys Gly Gln Pro Arg Glu Pro Gln Val
        355                 360                 365
Tyr Thr Leu Pro Pro Ser Arg Asp Glu Leu Thr Lys Asn Gln Val Ser
370                 375                 380
Leu Thr Cys Leu Val Lys Gly Phe Tyr Pro Ser Asp Ile Ala Val Glu
385                 390                 395                 400
Trp Glu Ser Asn Gly Gln Pro Glu Asn Asn Tyr Lys Thr Thr Pro Pro
                405                 410                 415
Val Leu Asp Ser Asp Gly Ser Phe Phe Leu Tyr Ser Lys Leu Thr Val
            420                 425                 430
Asp Lys Ser Arg Trp Gln Gln Gly Asn Val Phe Ser Cys Ser Val Met
        435                 440                 445
His Glu Ala Leu His Asn His Tyr Thr Gln Lys Ser Leu Ser Leu Ser
```

```
                450             455             460

Pro Gly
465

<210> SEQ ID NO 19
<211> LENGTH: 239
<212> TYPE: PRT
<213> ORGANISM: Artificial Sequence
<220> FEATURE:
<223> OTHER INFORMATION: Amino acid sequence of the light chain of
      humanized antibody IL17A-H069 containing signal peptide

<400> SEQUENCE: 19

Met Gly Trp Ser Cys Ile Ile Leu Phe Leu Val Ala Thr Ala Thr Gly
1               5                   10                  15

Val His Ser Asp Ile Val Met Thr Gln Ser Pro Asp Ser Leu Ala Val
            20                  25                  30

Ser Leu Gly Glu Arg Ala Thr Ile Asn Cys Lys Ser Ser Gln Ser Leu
        35                  40                  45

Leu Asn Arg Ser Asn Gln Lys Asn Tyr Leu Ala Trp Tyr Gln Gln Lys
    50                  55                  60

Pro Gly Gln Pro Pro Lys Leu Leu Val Asp Phe Ala Ser Thr Arg Glu
65                  70                  75                  80

Ser Gly Val Pro Asp Arg Phe Ser Gly Ser Gly Ser Gly Thr Asp Phe
                85                  90                  95

Thr Leu Thr Ile Ser Ser Leu Gln Ala Glu Asp Val Ala Val Tyr Phe
            100                 105                 110

Cys Gln Gln His Tyr Thr Thr Pro Phe Thr Phe Gly Pro Gly Thr Lys
        115                 120                 125

Val Asp Ile Lys Arg Thr Val Ala Ala Pro Ser Val Phe Ile Phe Pro
    130                 135                 140

Pro Ser Asp Glu Gln Leu Lys Ser Gly Thr Ala Ser Val Val Cys Leu
145                 150                 155                 160

Leu Asn Asn Phe Tyr Pro Arg Glu Ala Lys Val Gln Trp Lys Val Asp
                165                 170                 175

Asn Ala Leu Gln Ser Gly Asn Ser Gln Glu Ser Val Thr Glu Gln Asp
            180                 185                 190

Ser Lys Asp Ser Thr Tyr Ser Leu Ser Ser Thr Leu Thr Leu Ser Lys
        195                 200                 205

Ala Asp Tyr Glu Lys His Lys Val Tyr Ala Cys Glu Val Thr His Gln
    210                 215                 220

Gly Leu Ser Ser Pro Val Thr Lys Ser Phe Asn Arg Gly Glu Cys
225                 230                 235

<210> SEQ ID NO 20
<211> LENGTH: 19
<212> TYPE: PRT
<213> ORGANISM: Artificial Sequence
<220> FEATURE:
<223> OTHER INFORMATION: Amino acid sequence of the heavy chain signal
      peptide of humanized antibody IL17A-H069

<400> SEQUENCE: 20

Met Glu Leu Gly Leu Ser Trp Ile Phe Leu Leu Ala Ile Leu Lys Gly
1               5                   10                  15

Val Gln Cys

<210> SEQ ID NO 21
```

```
<211> LENGTH: 19
<212> TYPE: PRT
<213> ORGANISM: Artificial Sequence
<220> FEATURE:
<223> OTHER INFORMATION: Amino acid sequence of the light chain signal
      peptide of humanized antibody IL17A-H069/murine antibody IL17A-
      M069

<400> SEQUENCE: 21

Met Gly Trp Ser Cys Ile Ile Leu Phe Leu Val Ala Thr Ala Thr Gly
1               5                   10                  15

Val His Ser

<210> SEQ ID NO 22
<211> LENGTH: 118
<212> TYPE: PRT
<213> ORGANISM: Artificial Sequence
<220> FEATURE:
<223> OTHER INFORMATION: Amino acid sequence of the heavy chain variable
      region of humanized antibody IL17A-H069

<400> SEQUENCE: 22

Glu Val Gln Leu Val Gln Ser Gly Ala Glu Val Lys Lys Pro Gly Ala
1               5                   10                  15

Thr Val Lys Ile Ser Cys Lys Ala Ser Gly Tyr Thr Phe Thr Asp Tyr
            20                  25                  30

Glu Met His Trp Val Gln Gln Ala Pro Gly His Gly Leu Glu Trp Met
        35                  40                  45

Gly Val Ile His Pro Gly Gly Gly Thr Ala Tyr Asn Gln Lys Phe
    50                  55                  60

Lys Gly Arg Val Thr Ile Thr Ala Asp Thr Ser Thr Asp Thr Ala Tyr
65                  70                  75                  80

Met Glu Leu Ser Ser Leu Arg Ser Glu Asp Thr Ala Val Tyr Tyr Cys
                85                  90                  95

Thr Arg Gly Asp His Asp Gly Arg Thr Asp Tyr Trp Gly Gln Gly Thr
            100                 105                 110

Leu Val Thr Val Ser Ser
        115

<210> SEQ ID NO 23
<211> LENGTH: 113
<212> TYPE: PRT
<213> ORGANISM: Artificial Sequence
<220> FEATURE:
<223> OTHER INFORMATION: Amino acid sequence of the light chain variable
      region of humanized antibody IL17A-H069

<400> SEQUENCE: 23

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Arg
            20                  25                  30

Ser Asn Gln Lys Asn Tyr Leu Ala Trp Tyr Gln Gln Lys Pro Gly Gln
        35                  40                  45

Pro Pro Lys Leu Leu Val Asp Phe Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Phe Cys Gln Gln
                85                  90                  95
```

```
His Tyr Thr Thr Pro Phe Thr Phe Gly Pro Gly Thr Lys Val Asp Ile
                100                 105                 110
Lys
```

<210> SEQ ID NO 24
<211> LENGTH: 329
<212> TYPE: PRT
<213> ORGANISM: Artificial Sequence
<220> FEATURE:
<223> OTHER INFORMATION: Amino acid sequence of humanized antibody
    IL17A-H069 heavy chain constant region

<400> SEQUENCE: 24

```
Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly
                325
```

<210> SEQ ID NO 25
<211> LENGTH: 107
<212> TYPE: PRT
<213> ORGANISM: Artificial Sequence
<220> FEATURE:
<223> OTHER INFORMATION: Amino acid sequence of humanized antibody
       IL17A-H069 light chain constant region

<400> SEQUENCE: 25

```
Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105
```

<210> SEQ ID NO 26
<211> LENGTH: 1407
<212> TYPE: DNA
<213> ORGANISM: Artificial Sequence
<220> FEATURE:
<223> OTHER INFORMATION: Nucleotide sequence of the humanized antibody
       IL17A-H069 heavy chain containing signal peptide

<400> SEQUENCE: 26

```
atggagttgg gactgagctg gattttcctt ttggctattt taaaaggtgt ccagtgtgag      60
gtccaacttg tccagtctgg agcagaggtg aagaagcctg gagccacagt gaagatttcc     120
tgtaaggcat ctggctacac cttcacagac tatgagatgc actgggtcca acaggctcct     180
ggccatggat tggagtggat gggagtgatt caccctggag aggaggcac agcctacaac      240 cagaagttca agggcagggt gaccatcaca gcagacacca gcacagacac agcctatatg     300
gaactgtcct ccctgaggtc tgaggacaca gcagtctact actgtaccag ggagaccat      360 gatggcagga cagactactg gggacaaggc accctggtga cagtgtcctc tgcaagcacc     420
aagggcccat cggtcttccc cctggcaccc tcctccaaga gcacctctgg gggcacagcg     480
gccctgggct gcctggtcaa ggactacttc cccgaaccgg tgacggtgtc gtggaactca     540
ggcgccctga ccagcggcgt gcacaccttc ccggctgtcc tacagtcctc aggactctac     600
tccctcagca gcgtggtgac cgtgccctcc agcagcttgg gcacccagac ctacatctgc     660
aacgtgaatc acaagcccag caacaccaag gtggacaaga agttgagcc caaatcttgt     720 gacaaaactc acacatgccc accgtgccca gcacctgaac tcctgggggg accgtcagtc     780
ttcctcttcc ccccaaaacc caaggacacc ctcatgatct cccggacccc tgaggtcacg     840
tgcgtggtgg tggacgtgag ccacgaagac cccgaggtca agttcaactg gtacgtggac     900
ggcgtggagg tgcataatgc caagacaaag ccgcgggagg agcagtacaa cagcacgtac     960
cgtgtggtca gcgtcctcac cgtcctgcac caggactggc tgaatggcaa ggagtacaag    1020
tgcaaggtct ccaacaaagc cctcccagcc cccatcgaga aaaccatctc caaagccaaa    1080
```

```
gggcagcccc gagaaccaca ggtgtacacc ctgcccccat cccgggatga gctgaccaag    1140
aaccaggtca gcctgacctg cctggtcaaa ggcttctatc ccagcgacat cgccgtggag    1200
tgggagagca atgggcagcc ggagaacaac tacaagacca cgcctcccgt gctggactcc    1260
gacggctcct tcttcctcta cagcaagctc accgtggaca gagcaggtg gcagcagggg    1320 aacgtcttct catgctccgt gatgcatgag gctctgcaca accactacac ccagaagtcc    1380
ctgtctctga gccctggcta atagtga                                       1407

<210> SEQ ID NO 27
<211> LENGTH: 720
<212> TYPE: DNA
<213> ORGANISM: Artificial Sequence
<220> FEATURE:
<223> OTHER INFORMATION: Nucleotide sequence of the humanized antibody
      IL17A-H069 light chain containing signal peptide

<400> SEQUENCE: 27
atgggctggt cctgtatcat cctgttcctg gtggctacag ccacaggagt gcattctgac     60
attgtgatga cccagagccc tgactccctg ctgtgtccc tgggagagag ggctaccatc    120
aactgtaagt ccagccagtc cctgctgaac aggagcaacc agaagaacta cctggcttgg    180
tatcaacaga agcctggaca acctccaaaa ctgctggtgg actttgccag caccagggag    240
tctggagtgc ctgacaggtt ctctggctct ggctctggca cagacttcac cctgaccatc    300
tcctccctcc aagcagagga tgtggctgtc tacttctgtc aacaacacta caccacacca    360
ttcacctttg gacctggcac caaggtggac atcaagcgta cggtggctgc accatctgtc    420
ttcatcttcc cgccatctga tgagcagttg aaatctggaa ctgcctctgt tgtgtgcctg    480
ctgaataact tctatcccag agaggccaaa gtacagtgga aggtggataa cgccctccaa    540
tcgggtaact cccaggagag tgtcacagag caggacagca aggacagcac ctacagcctc    600
agcagcaccc tgacgctgag caaagcagac tacgagaaac acaaagtcta cgcctgcgaa    660
gtcacccatc agggcctgag ctcgcccgtc acaaagagct tcaacagggg agagtgttaa    720

<210> SEQ ID NO 28
<211> LENGTH: 57
<212> TYPE: DNA
<213> ORGANISM: Artificial Sequence
<220> FEATURE:
<223> OTHER INFORMATION: Nucleotide sequence of the heavy chain signal
      peptide of humanized antibody IL17A-H069

<400> SEQUENCE: 28
atggagttgg gactgagctg gattttcctt ttggctattt taaaaggtgt ccagtgt       57

<210> SEQ ID NO 29
<211> LENGTH: 57
<212> TYPE: DNA
<213> ORGANISM: Artificial Sequence
<220> FEATURE:
<223> OTHER INFORMATION: Nucleotide sequence of the light chain signal
      peptide of humanized antibody IL17A-H069

<400> SEQUENCE: 29
atgggctggt cctgtatcat cctgttcctg gtggctacag ccacaggagt gcattct       57

<210> SEQ ID NO 30
<211> LENGTH: 354
<212> TYPE: DNA
<213> ORGANISM: Artificial Sequence
<220> FEATURE:
```

<223> OTHER INFORMATION: Nucleotide sequence of the heavy chain variable
      region of humanized antibody IL17A-H069

<400> SEQUENCE: 30

```
gaggtccaac ttgtccagtc tggagcagag gtgaagaagc ctggagccac agtgaagatt      60
tcctgtaagg catctggcta caccttcaca gactatgaga tgcactgggt ccaacaggct     120
cctggccatg gattggagtg gatgggagtg attcaccctg gaggaggagg cacagcctac     180
aaccagaagt tcaagggcag ggtgaccatc acagcagaca ccagcacaga cacagcctat     240
atggaactgt cctccctgag gtctgaggac acagcagtct actactgtac caggggagac     300
catgatggca ggacagacta ctggggacaa ggcaccctgg tgacagtgtc ctct           354
```

<210> SEQ ID NO 31
<211> LENGTH: 339
<212> TYPE: DNA
<213> ORGANISM: Artificial Sequence
<220> FEATURE:
<223> OTHER INFORMATION: Nucleotide sequence of the light chain variable
      region of humanized antibody IL17A-H069

<400> SEQUENCE: 31

```
gacattgtga tgacccagag ccctgactcc ctggctgtgt ccctgggaga gagggctacc      60
atcaactgta gtccagccag tccctgctg aacaggagca accagaagaa ctacctggct      120
tggtatcaac agaagcctgg acaacctcca aaactgctgg tggactttgc cagcaccagg     180
gagtctggag tgcctgacag gttctctggc tctggctctg gcacagactt cacccctgacc   240 atctcctccc tccaagcaga ggatgtggct gtctacttct gtcaacaaca ctacaccaca     300
ccattcacct ttggacctgg caccaaggtg gacatcaag                            339
```

<210> SEQ ID NO 32
<211> LENGTH: 996
<212> TYPE: DNA
<213> ORGANISM: Artificial Sequence
<220> FEATURE:
<223> OTHER INFORMATION: Nucleotide sequence of the heavy chain constant
      region of humanized antibody IL17A-H069

<400> SEQUENCE: 32

```
gcaagcacca agggcccatc ggtcttcccc ctggcaccct cctccaagag cacctctggg      60
ggcacagcgg ccctgggctg cctggtcaag gactacttcc ccgaaccggt gacggtgtcg     120
tggaactcag gcgccctgac cagcggcgtg cacaccttcc cggctgtcct acagtcctca     180
ggactctact ccctcagcag cgtggtgacc gtgccctcca gcagcttggg cacccagacc     240
tacatctgca acgtgaatca caagcccagc aacaccaagg tggacaagaa agttgagccc     300
aaatcttgtg acaaaactca cacatgccca ccgtgcccag cacctgaact cctggggga     360 ccgtcagtct tcctcttccc cccaaaaccc aaggacaccc tcatgatctc ccggacccct    420
gaggtcacgt gcgtggtggt ggacgtgagc cacgaagacc ccgaggtcaa gttcaactgg    480
tacgtggacg gcgtggaggt gcataatgcc aagacaaagc cgcgggagga gcagtacaac    540
agcacgtacc gtgtggtcag cgtcctcacc gtcctgcacc aggactggct gaatggcaag    600
gagtacaagt gcaaggtctc caacaaagcc ctcccagccc ccatcgagaa aaccatctcc    660
aaagccaaag ggcagccccg agaaccacag gtgtacaccc tgcccccatc ccgggatgag    720
ctgaccaaga accaggtcag cctgacctgc ctggtcaaag gcttctatcc cagcgacatc    780
gccgtggagt gggagagcaa tgggcagccg gagaacaact acaagaccac gcctcccgtg    840
```

```
ctggactccg acggctcctt cttcctctac agcaagctca ccgtggacaa gagcaggtgg    900
cagcagggga acgtcttctc atgctccgtg atgcatgagg ctctgcacaa ccactacacc    960
cagaagtccc tgtctctgag ccctggctaa tagtga                              996
```

```
<210> SEQ ID NO 33
<211> LENGTH: 324
<212> TYPE: DNA
<213> ORGANISM: Artificial Sequence
<220> FEATURE:
<223> OTHER INFORMATION: Nucleotide sequence of the light chain constant
      region of humanized antibody IL17A-H069

<400> SEQUENCE: 33
```

```
cgtacggtgg ctgcaccatc tgtcttcatc ttcccgccat ctgatgagca gttgaaatct    60
ggaactgcct ctgttgtgtg cctgctgaat aacttctatc ccagagaggc caaagtacag    120
tggaaggtgg ataacgccct ccaatcgggt aactcccagg agagtgtcac agagcaggac    180
agcaaggaca gcacctacag cctcagcagc accctgacgc tgagcaaagc agactacgag    240
aaacacaaag tctacgcctg cgaagtcacc catcagggcc tgagctcgcc cgtcacaaag    300
agcttcaaca ggggagagtg ttaa                                           324
```

```
<210> SEQ ID NO 34
<211> LENGTH: 249
<212> TYPE: PRT
<213> ORGANISM: Artificial Sequence
<220> FEATURE:
<223> OTHER INFORMATION: Amino acid sequence of murine antibody scFv
      used in the construction of antibody IL17A-M069

<400> SEQUENCE: 34
```

Asp Ile Val Met Ser Gln Ser Pro Ser Ser Leu Ala Met Ser Val Gly
1               5                   10                  15

Gln Lys Val Thr Met Asn Cys Lys Ser Asn Gln Ser Leu Leu Asn Arg
            20                  25                  30

Ser Asn Gln Lys Asn Tyr Leu Ala Trp Tyr Gln Gln Lys Pro Gly Gln
        35                  40                  45

Ser Pro Lys Leu Leu Val Asp Phe Ala Ser Thr Arg Glu Ser Gly Val
    50                  55                  60

Pro Asp Arg Phe Ile Gly Ser Gly Ser Gly Thr Asp Phe Ser Leu Thr
65                  70                  75                  80

Ile Ser Ser Val Gln Ala Glu Asp Leu Ala Asp Tyr Phe Cys Gln Gln
                85                  90                  95

His Tyr Thr Thr Pro Phe Thr Phe Gly Ser Gly Thr Lys Leu Glu Ile
            100                 105                 110

Lys Ser Ser Gly Gly Gly Gly Ser Gly Gly Gly Gly Gly Ser Ser
        115                 120                 125

Arg Ser Ser Gln Ala His Leu Gln Gln Ser Gly Ala Glu Leu Val Arg
    130                 135                 140

Pro Gly Ala Ser Val Lys Leu Ser Cys Lys Ala Leu Gly Tyr Thr Phe
145                 150                 155                 160

Thr Asp Tyr Glu Met His Trp Val Lys Gln Thr Pro Val His Gly Leu
                165                 170                 175

Glu Trp Ile Gly Val Ile His Pro Gly Gly Gly Thr Ala Tyr Asn
            180                 185                 190

Gln Lys Phe Lys Gly Lys Ala Thr Leu Thr Ala Asp Lys Ser Ser Ser
        195                 200                 205

```
Thr Ala Tyr Met Glu Leu Ser Ser Leu Thr Ser Glu Asp Ser Ala Val
    210                 215                 220

Tyr Tyr Cys Thr Arg Gly Asp His Asp Gly Arg Thr Asp Tyr Trp Gly
225                 230                 235                 240

Gln Gly Thr Thr Leu Thr Val Ser Ser
                245
```

<210> SEQ ID NO 35
<211> LENGTH: 18
<212> TYPE: PRT
<213> ORGANISM: Artificial Sequence
<220> FEATURE:
<223> OTHER INFORMATION: Amino acid sequence of the linker used in the
      construction of the phage antibody library for the linkage of
      murine antibody scFv

<400> SEQUENCE: 35

```
Ser Ser Gly Gly Gly Gly Ser Gly Gly Gly Gly Gly Gly Ser Ser Arg
1               5                   10                  15

Ser Ser
```

<210> SEQ ID NO 36
<211> LENGTH: 1386
<212> TYPE: DNA
<213> ORGANISM: Artificial Sequence
<220> FEATURE:
<223> OTHER INFORMATION: Nucleotide sequence of the murine antibody
      IL17A-M069 heavy chain containing signal peptide

<400> SEQUENCE: 36

| | | | | |
|---|---|---|---|---|
| atgggctggt | ccctgattct | gctgttcctg | gtggctgtgg | ctaccagggt | gctgagccag | 60 |
| gcccaccttc | aacagtctgg | ggctgagctg | gtgaggcctg | gggcttcagt | gaagctgtcc | 120 |
| tgcaaggctt | tgggctacac | atttactgac | tatgaaatgc | actgggtgaa | acagacacct | 180 |
| gtgcatggcc | tggaatggat | tggagttatt | catccaggag | gtggtggtac | ggcctacaat | 240 |
| cagaagttca | agggcaaggc | cacactgact | gcagacaagt | cctccagtac | agcctacatg | 300 |
| gagctcagca | gcctgacatc | tgaggactct | gctgtctatt | actgtacaag | agggatcac | 360 |
| gacggaagga | ctgactactg | gggccaaggc | accactctca | cagtctcctc | agccaaaacg | 420 |
| acacccccat | ctgtctatcc | actggcccct | ggatctgctg | cccaaactaa | ctccatggtg | 480 |
| accctgggat | gcctggtcaa | gggctatttc | cctgagccag | tgacagtgac | ctggaactct | 540 |
| ggatccctgt | ccagcggtgt | gcacaccttc | ccagctgtcc | tgcagtctga | cctctacact | 600 |
| ctgagcagct | cagtgactgt | cccctccagc | acctggccca | gcgagaccgt | cacctgcaac | 660 |
| gttgcccacc | cggccagcag | caccaaggtg | gacaagaaaa | ttgtgcccag | ggattgtggt | 720 |
| tgtaagcctt | gcatatgtac | agtcccagaa | gtatcatctg | tcttcatctt | ccccccaaag | 780 |
| cccaaggatg | tgctcaccat | tactctgact | cctaaggtca | cgtgtgttgt | ggtagacatc | 840 |
| agcaaggatg | atcccgaggt | ccagttcagc | tggtttgtag | atgatgtgga | ggtgcacaca | 900 |
| gctcagacgc | aaccccggga | ggagcagttc | aacagcactt | tccgctcagt | cagtgaactt | 960 |
| cccatcatgc | accaggactg | gctcaatggc | aaggagttca | aatgcagggt | caacagtgca | 1020 |
| gctttccctg | cccccatcga | gaaaaccatc | tccaaaacca | aaggcagacc | gaaggctcca | 1080 |
| caggtgtaca | ccattccacc | tccccaaggag | cagatggcca | aggataaagt | cagtctgacc | 1140 |
| tgcatgataa | cagacttctt | ccctgaagac | attactgtgg | agtggcagtg | gaatgggcag | 1200 |
| ccagcggaga | actacaagaa | cactcagccc | atcatggaca | cagatggctc | ttacttcgtc | 1260 |

```
tacagcaagc tcaatgtgca agagagcaac tgggaggcag aaatacttt cacctgctct    1320 gtgttacatg agggcctgca caaccaccat actgagaaga gcctctccca ctctcctggt   1380
aaataa                                                               1386

<210> SEQ ID NO 37
<211> LENGTH: 721
<212> TYPE: DNA
<213> ORGANISM: Artificial Sequence
<220> FEATURE:
<223> OTHER INFORMATION: Nucleotide sequence of the murine antibody
      IL17A-M069 light chain containing signal peptide

<400> SEQUENCE: 37
atgggctggt cctgtatcat cctgttcctg gtggctacag ccacaggagt gcatagcgac     60
attgtgatgt cacagtctcc atcctccctg gctatgtcag taggacagaa ggtcactatg    120
aactgcaagt ccaatcagag ccttttaaat agaagcaatc aaaagaacta tttggcctgg    180
taccagcaga aaccaggaca gtctcctaaa cttctggtag actttgcatc cactaggaa     240 tctggggtcc ctgatcgctt cataggcagt ggatctggga cagatttcag tcttaccatc    300
agcagtgtgc aggctgagga cctggcagat tacttctgtc agcaacatta ccactcca     360 ttcacgttcg gctcggggac caagctggaa ataaaacggg ctgatgctgc accaactgta    420
tccatcttcc caccatccag tgagcagtta acatctggag gtgcctcagt cgtgtgcttc    480
ttgaacaact ctaccccaa agcatcaat gtcaagtgga agattgatgg cagtgaacga    540
caaaatggcg tcctgaacag ttggactgat caggacagca agacagcac ctacagcatg    600 agcagcaccc tcacgttgac caaggacgag tatgaacgac ataacagcta cctgtgag     660 gccactcaca agcatcaac ttcacccatt gtcaagagct tcaacaggaa tgagtgttaa    720
a                                                                   721

<210> SEQ ID NO 38
<211> LENGTH: 461
<212> TYPE: PRT
<213> ORGANISM: Artificial Sequence
<220> FEATURE:
<223> OTHER INFORMATION: Amino acid sequence of the heavy chain of
      murine antibody IL17A-M069 containing signal peptide

<400> SEQUENCE: 38

Met Gly Trp Ser Leu Ile Leu Leu Phe Leu Val Ala Val Ala Thr Arg
1               5                   10                  15

Val Leu Ser Gln Ala His Leu Gln Gln Ser Gly Ala Glu Leu Val Arg
            20                  25                  30

Pro Gly Ala Ser Val Lys Leu Ser Cys Lys Ala Leu Gly Tyr Thr Phe
        35                  40                  45

Thr Asp Tyr Glu Met His Trp Val Lys Gln Thr Pro Val His Gly Leu
    50                  55                  60

Glu Trp Ile Gly Val Ile His Pro Gly Gly Gly Thr Ala Tyr Asn
65                  70                  75                  80

Gln Lys Phe Lys Gly Lys Ala Thr Leu Thr Ala Asp Lys Ser Ser
                85                  90                  95

Thr Ala Tyr Met Glu Leu Ser Ser Leu Thr Ser Glu Asp Ser Ala Val
            100                 105                 110

Tyr Tyr Cys Thr Arg Gly Asp His Asp Gly Arg Thr Asp Tyr Trp Gly
        115                 120                 125

Gln Gly Thr Thr Leu Thr Val Ser Ser Ala Lys Thr Thr Pro Pro Ser
```

```
                130                 135                 140
Val Tyr Pro Leu Ala Pro Gly Ser Ala Ala Gln Thr Asn Ser Met Val
145                 150                 155                 160

Thr Leu Gly Cys Leu Val Lys Gly Tyr Phe Pro Glu Pro Val Thr Val
                165                 170                 175

Thr Trp Asn Ser Gly Ser Leu Ser Ser Gly Val His Thr Phe Pro Ala
            180                 185                 190

Val Leu Gln Ser Asp Leu Tyr Thr Leu Ser Ser Val Thr Val Pro
        195                 200                 205

Ser Ser Thr Trp Pro Ser Glu Thr Val Thr Cys Asn Val Ala His Pro
210                 215                 220

Ala Ser Ser Thr Lys Val Asp Lys Lys Ile Val Pro Arg Asp Cys Gly
225                 230                 235                 240

Cys Lys Pro Cys Ile Cys Thr Val Pro Glu Val Ser Ser Val Phe Ile
                245                 250                 255

Phe Pro Pro Lys Pro Lys Asp Val Leu Thr Ile Thr Leu Thr Pro Lys
            260                 265                 270

Val Thr Cys Val Val Val Asp Ile Ser Lys Asp Asp Pro Glu Val Gln
        275                 280                 285

Phe Ser Trp Phe Val Asp Asp Val Glu Val His Thr Ala Gln Thr Gln
290                 295                 300

Pro Arg Glu Glu Gln Phe Asn Ser Thr Phe Arg Ser Val Ser Glu Leu
305                 310                 315                 320

Pro Ile Met His Gln Asp Trp Leu Asn Gly Lys Glu Phe Lys Cys Arg
                325                 330                 335

Val Asn Ser Ala Ala Phe Pro Ala Pro Ile Glu Lys Thr Ile Ser Lys
            340                 345                 350

Thr Lys Gly Arg Pro Lys Ala Pro Gln Val Tyr Thr Ile Pro Pro Pro
        355                 360                 365

Lys Glu Gln Met Ala Lys Asp Lys Val Ser Leu Thr Cys Met Ile Thr
370                 375                 380

Asp Phe Phe Pro Glu Asp Ile Thr Val Glu Trp Gln Trp Asn Gly Gln
385                 390                 395                 400

Pro Ala Glu Asn Tyr Lys Asn Thr Gln Pro Ile Met Asp Thr Asp Gly
                405                 410                 415

Ser Tyr Phe Val Tyr Ser Lys Leu Asn Val Gln Lys Ser Asn Trp Glu
            420                 425                 430

Ala Gly Asn Thr Phe Thr Cys Ser Val Leu His Glu Gly Leu His Asn
        435                 440                 445

His His Thr Glu Lys Ser Leu Ser His Ser Pro Gly Lys
450                 455                 460

<210> SEQ ID NO 39
<211> LENGTH: 239
<212> TYPE: PRT
<213> ORGANISM: Artificial Sequence
<220> FEATURE:
<223> OTHER INFORMATION: Amino acid sequence of the light chain of
      murine antibody IL17A-M069 containing signal peptide

<400> SEQUENCE: 39

Met Gly Trp Ser Cys Ile Ile Leu Phe Leu Val Ala Thr Ala Thr Gly
1               5                   10                  15

Val His Ser Asp Ile Val Met Ser Gln Ser Pro Ser Ser Leu Ala Met
            20                  25                  30
```

```
Ser Val Gly Gln Lys Val Thr Met Asn Cys Lys Ser Asn Gln Ser Leu
         35                  40                  45

Leu Asn Arg Ser Asn Gln Lys Asn Tyr Leu Ala Trp Tyr Gln Gln Lys
 50                  55                  60

Pro Gly Gln Ser Pro Lys Leu Leu Val Asp Phe Ala Ser Thr Arg Glu
 65                  70                  75                  80

Ser Gly Val Pro Asp Arg Phe Ile Gly Ser Gly Ser Gly Thr Asp Phe
                 85                  90                  95

Ser Leu Thr Ile Ser Ser Val Gln Ala Glu Asp Leu Ala Asp Tyr Phe
                100                 105                 110

Cys Gln Gln His Tyr Thr Thr Pro Phe Thr Phe Gly Ser Gly Thr Lys
                115                 120                 125

Leu Glu Ile Lys Arg Ala Asp Ala Ala Pro Thr Val Ser Ile Phe Pro
130                 135                 140

Pro Ser Ser Glu Gln Leu Thr Ser Gly Gly Ala Ser Val Val Cys Phe
145                 150                 155                 160

Leu Asn Asn Phe Tyr Pro Lys Asp Ile Asn Val Lys Trp Lys Ile Asp
                165                 170                 175

Gly Ser Glu Arg Gln Asn Gly Val Leu Asn Ser Trp Thr Asp Gln Asp
                180                 185                 190

Ser Lys Asp Ser Thr Tyr Ser Met Ser Ser Thr Leu Thr Leu Thr Lys
                195                 200                 205

Asp Glu Tyr Glu Arg His Asn Ser Tyr Thr Cys Glu Ala Thr His Lys
                210                 215                 220

Thr Ser Thr Ser Pro Ile Val Lys Ser Phe Asn Arg Asn Glu Cys
225                 230                 235
```

<210> SEQ ID NO 40
<211> LENGTH: 324
<212> TYPE: PRT
<213> ORGANISM: Artificial Sequence
<220> FEATURE:
<223> OTHER INFORMATION: Amino acid sequence of the heavy chain constant
      region of murine antibody IL17A-M069

<400> SEQUENCE: 40

```
Ala Lys Thr Thr Pro Pro Ser Val Tyr Pro Leu Ala Pro Gly Ser Ala
 1               5                  10                  15

Ala Gln Thr Asn Ser Met Val Thr Leu Gly Cys Leu Val Lys Gly Tyr
                 20                  25                  30

Phe Pro Glu Pro Val Thr Val Thr Trp Asn Ser Gly Ser Leu Ser Ser
             35                  40                  45

Gly Val His Thr Phe Pro Ala Val Leu Gln Ser Asp Leu Tyr Thr Leu
 50                  55                  60

Ser Ser Ser Val Thr Val Pro Ser Ser Thr Trp Pro Ser Glu Thr Val
 65                  70                  75                  80

Thr Cys Asn Val Ala His Pro Ala Ser Ser Thr Lys Val Asp Lys Lys
                 85                  90                  95

Ile Val Pro Arg Asp Cys Gly Cys Lys Pro Cys Ile Cys Thr Val Pro
                100                 105                 110

Glu Val Ser Ser Val Phe Ile Phe Pro Pro Lys Pro Lys Asp Val Leu
                115                 120                 125

Thr Ile Thr Leu Thr Pro Lys Val Thr Cys Val Val Val Asp Ile Ser
130                 135                 140

Lys Asp Asp Pro Glu Val Gln Phe Ser Trp Phe Val Asp Val Glu
145                 150                 155                 160
```

Val His Thr Ala Gln Thr Gln Pro Arg Glu Glu Gln Phe Asn Ser Thr
            165                 170                 175

Phe Arg Ser Val Ser Glu Leu Pro Ile Met His Gln Asp Trp Leu Asn
            180                 185                 190

Gly Lys Glu Phe Lys Cys Arg Val Asn Ser Ala Ala Phe Pro Ala Pro
            195                 200                 205

Ile Glu Lys Thr Ile Ser Lys Thr Lys Gly Arg Pro Lys Ala Pro Gln
        210                 215                 220

Val Tyr Thr Ile Pro Pro Lys Glu Gln Met Ala Lys Asp Lys Val
225                 230                 235                 240

Ser Leu Thr Cys Met Ile Thr Asp Phe Phe Pro Glu Asp Ile Thr Val
            245                 250                 255

Glu Trp Gln Trp Asn Gly Gln Pro Ala Glu Asn Tyr Lys Asn Thr Gln
            260                 265                 270

Pro Ile Met Asp Thr Asp Gly Ser Tyr Phe Val Tyr Ser Lys Leu Asn
            275                 280                 285

Val Gln Lys Ser Asn Trp Glu Ala Gly Asn Thr Phe Thr Cys Ser Val
        290                 295                 300

Leu His Glu Gly Leu His Asn His His Thr Glu Lys Ser Leu Ser His
305                 310                 315                 320

Ser Pro Gly Lys

<210> SEQ ID NO 41
<211> LENGTH: 107
<212> TYPE: PRT
<213> ORGANISM: Artificial Sequence
<220> FEATURE:
<223> OTHER INFORMATION: Amino acid sequence of the light chain constant
      region of murine antibody IL17A-M069

<400> SEQUENCE: 41

Arg Ala Asp Ala Ala Pro Thr Val Ser Ile Phe Pro Pro Ser Ser Glu
1               5                   10                  15

Gln Leu Thr Ser Gly Gly Ala Ser Val Val Cys Phe Leu Asn Asn Phe
            20                  25                  30

Tyr Pro Lys Asp Ile Asn Val Lys Trp Lys Ile Asp Gly Ser Glu Arg
        35                  40                  45

Gln Asn Gly Val Leu Asn Ser Trp Thr Asp Gln Asp Ser Lys Asp Ser
    50                  55                  60

Thr Tyr Ser Met Ser Ser Thr Leu Thr Leu Thr Lys Asp Glu Tyr Glu
65                  70                  75                  80

Arg His Asn Ser Tyr Thr Cys Glu Ala Thr His Lys Thr Ser Thr Ser
                85                  90                  95

Pro Ile Val Lys Ser Phe Asn Arg Asn Glu Cys
            100                 105

<210> SEQ ID NO 42
<211> LENGTH: 19
<212> TYPE: PRT
<213> ORGANISM: Artificial Sequence
<220> FEATURE:
<223> OTHER INFORMATION: Amino acid sequence of the heavy chain signal
      peptide of murine antibody IL17A-M069

<400> SEQUENCE: 42

Met Gly Trp Ser Leu Ile Leu Leu Phe Leu Val Ala Val Ala Thr Arg
1               5                   10                  15

```
Val Leu Ser

<210> SEQ ID NO 43
<211> LENGTH: 57
<212> TYPE: DNA
<213> ORGANISM: Artificial Sequence
<220> FEATURE:
<223> OTHER INFORMATION: Nucleotide sequence of the heavy chain signal
      peptide of murine antibody IL17A-M069

<400> SEQUENCE: 43
atgggctggt ccctgattct gctgttcctg gtggctgtgg ctaccagggt gctgagc          57
```